United States Patent
Nielsen-Cole et al.

(10) Patent No.: US 10,160,193 B2
(45) Date of Patent: Dec. 25, 2018

(54) ADDITIVE MANUFACTURING TECHNIQUES AND SYSTEMS TO FORM COMPOSITE MATERIALS

(71) Applicant: Orbital Composites, Inc., San Jose, CA (US)

(72) Inventors: Cole Nielsen-Cole, San Jose, CA (US); James Frei, Dixon, CA (US)

(73) Assignee: Orbital Composites, Inc., San Jose, CA (US)

( * ) Notice: Subject to any disclaimer, the term of this patent is extended or adjusted under 35 U.S.C. 154(b) by 361 days.

(21) Appl. No.: 14/940,423

(22) Filed: Nov. 13, 2015

(65) Prior Publication Data

US 2016/0136885 A1    May 19, 2016

Related U.S. Application Data

(60) Provisional application No. 62/148,174, filed on Apr. 15, 2015, provisional application No. 62/079,923, filed on Nov. 14, 2014.

(51) Int. Cl.
*B29C 64/20*    (2017.01)
*B33Y 30/00*    (2015.01)
(Continued)

(52) U.S. Cl.
CPC .......... *B33Y 30/00* (2014.12); *B29C 47/0002* (2013.01); *B29C 47/0014* (2013.01);
(Continued)

(58) Field of Classification Search
CPC ... B29C 47/266; B29C 47/268; B29C 47/265; B29C 47/128; B29C 64/00; B29C 64/20;
(Continued)

(56) References Cited

U.S. PATENT DOCUMENTS

| | | | |
|---|---|---|---|
| 4,456,713 | A | 6/1984 | French et al. |
| 5,124,095 | A | 6/1992 | Gianni et al. |

(Continued)

OTHER PUBLICATIONS

'Make Silicone Molds for your 3D printed object' (MEPLER). https:/fweb .archive.org/web/20140325003630/http:/1www .instructables.com/id/Make-Silicone-Mo 33-36.
(Continued)

*Primary Examiner* — Joseph S Del Sole
*Assistant Examiner* — Cedrick S Williams
(74) *Attorney, Agent, or Firm* — AdamantineIP

(57) ABSTRACT

A printer system may include a coaxial extruder head that extrudes a core, a bulk, and/or a core and bulk cladding to form complex structures without retooling. The coaxial extruder head may include a distribution channel with an entrance and an exit, a priming chamber that surrounds the distribution channel. The priming chamber may include an outlet and a first inlet, a heating element thermally connected to the priming chamber, and a nozzle connected to the outlet of the priming chamber. Further, the nozzle may converge from the outlet of the priming chamber to an orifice of the nozzle. In addition, the exit of the distribution channel may be disposed at the orifice of the nozzle. This structure facilitates extruding a core and cladding type composite from the extruder head.

46 Claims, 30 Drawing Sheets

(51) Int. Cl.
*B33Y 50/02* (2015.01)
*B29C 47/00* (2006.01)
*B29C 64/386* (2017.01)
*B29C 47/06* (2006.01)
*B29C 47/12* (2006.01)
*B29C 64/209* (2017.01)
*B29C 64/118* (2017.01)
*B29C 64/194* (2017.01)
*B29K 101/12* (2006.01)
*B29L 31/16* (2006.01)
*B29C 47/08* (2006.01)
*B29C 47/86* (2006.01)

(52) U.S. Cl.
CPC .......... *B29C 47/065* (2013.01); *B29C 47/128* (2013.01); *B29C 64/118* (2017.08); *B29C 64/194* (2017.08); *B29C 64/209* (2017.08); *B29C 64/386* (2017.08); *B33Y 50/02* (2014.12); *B29C 47/0064* (2013.01); *B29C 47/0866* (2013.01); *B29C 47/862* (2013.01); *B29K 2101/12* (2013.01); *B29L 2031/16* (2013.01)

(58) Field of Classification Search
CPC . B29C 64/209; B29C 47/0045; B29C 47/005; B29C 47/06; B29C 47/28
USPC .............................................. 425/130, 131.1
See application file for complete search history.

(56) References Cited

U.S. PATENT DOCUMENTS

| | | |
|---|---|---|
| 5,259,901 A | 11/1993 | Davis et al. |
| 5,690,972 A | 11/1997 | Planet et al. |
| 5,906,781 A | 5/1999 | Tobin |
| 5,936,861 A | 8/1999 | Jang et al. |
| 6,129,872 A * | 10/2000 | Jang ........................ B29C 41/36 264/245 |
| 6,164,850 A | 12/2000 | Speakman |
| 6,363,606 B1 | 4/2002 | Johnson et al. |
| 8,827,684 B1 | 9/2014 | Schumacher et al. |
| 2005/0140050 A1 | 6/2005 | Tsai et al. |
| 2005/0280185 A1 | 12/2005 | Russell et al. |
| 2007/0009606 A1 | 1/2007 | Serdy et al. |
| 2009/0258217 A1 | 10/2009 | Hoefflin et al. |
| 2010/0191360 A1 | 7/2010 | Napadensky et al. |
| 2010/0237531 A1 | 9/2010 | Lyons et al. |
| 2011/0060445 A1 | 3/2011 | Heenan |
| 2014/0328964 A1* | 11/2014 | Mark .................. B29C 67/0088 425/166 |
| 2016/0052206 A1* | 2/2016 | Fruth .................... B29C 64/241 425/132 |

OTHER PUBLICATIONS

International Search Report and Written Opinion received for PCT Patent Application No. PCT/US2015/060185 dated Mar. 29, 2015. (17 total pages).

* cited by examiner

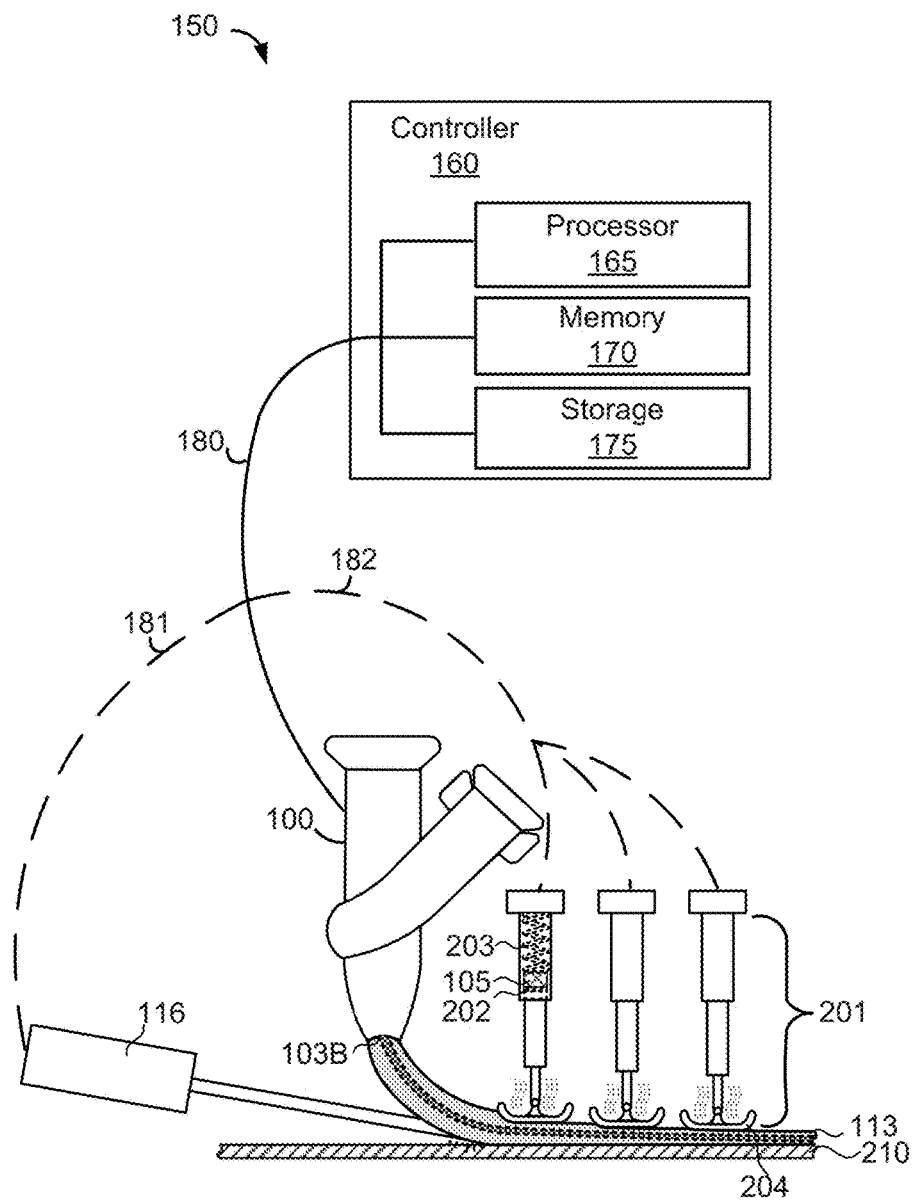

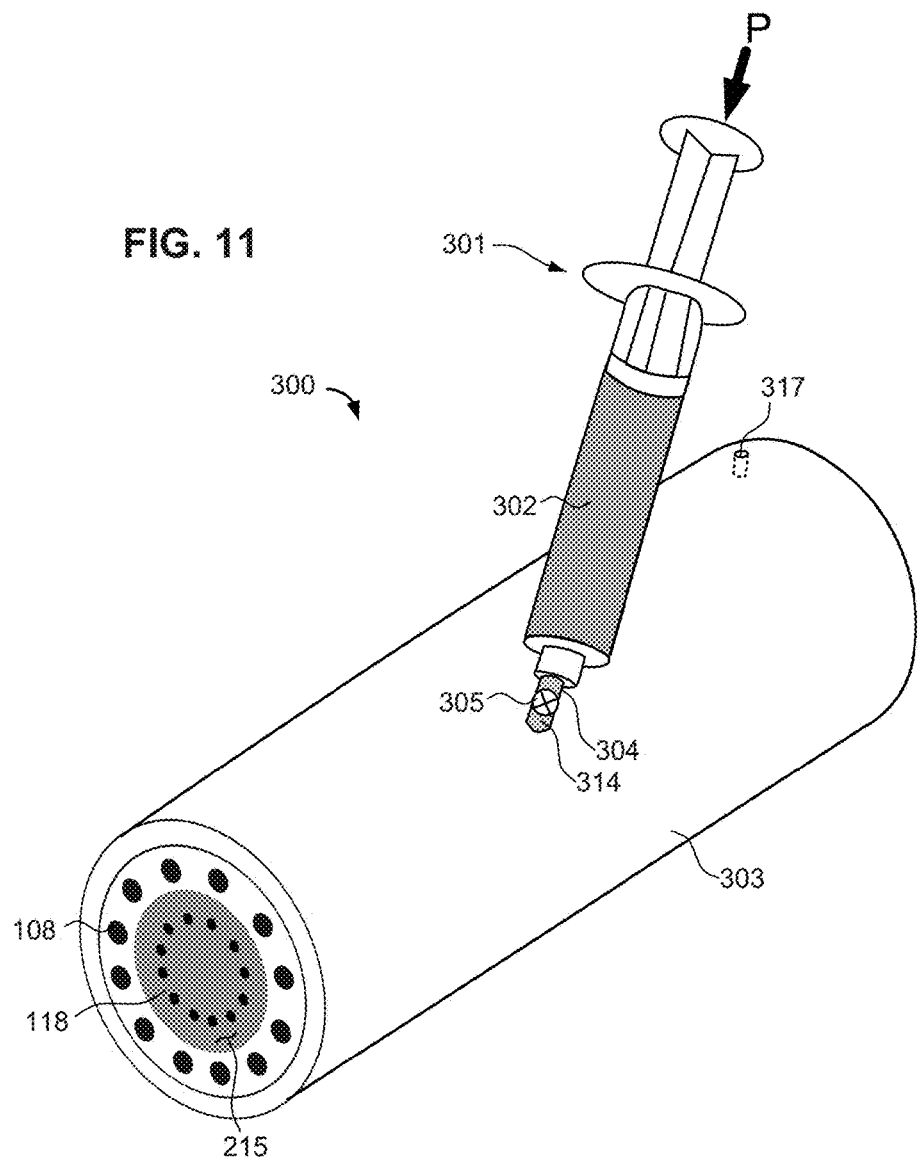

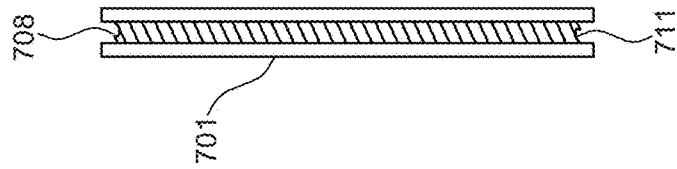
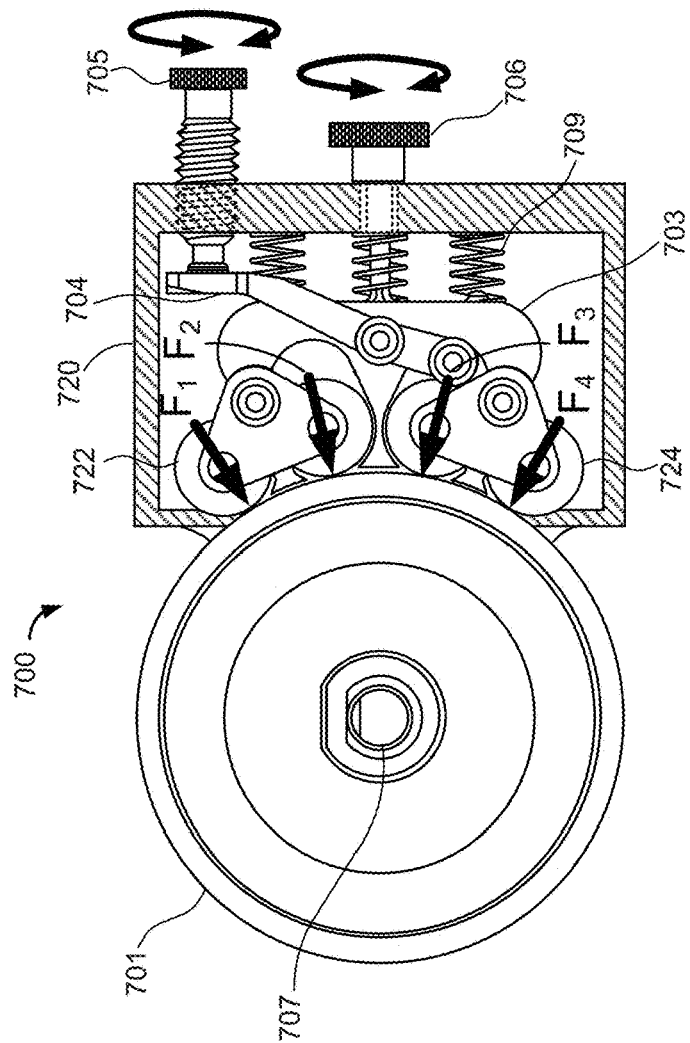

ADDITIVE MANUFACTURING TECHNIQUES AND SYSTEMS TO FORM COMPOSITE MATERIALS

CLAIM OF PRIORITY

The present application claims priority to Provisional Application No. 62/079,923, entitled "COAXIAL EXTRUSION TOOL HEAD FOR 3D PRINTERS WITH ACTIVE MOLDING AND INJECTION MOLDING," filed Nov. 14, 2014, and Provisional Application No. 62/148,174, entitled "COAXIAL EXTRUSION TOOL, 3D EXTRUDER AND FILAMENT WINDER TECHNIQUE, AND FORMING 3D STRUCTURES WITH HIGHLY SOLUBLE MATERIALS," filed Apr. 15, 2015, each of which is hereby incorporated by reference in its entirety.

BACKGROUND

The present disclosure relates generally to three-dimensional (3D) printers, and more specifically to the devices, assemblies and techniques to adaptively form complex composite materials.

Most 3D printers rely on an extruder head to deposit a thin heated bead of material to specified layers to additively form an object. The extruder head moves both horizontally and vertically to guide the placement for each layer of the heated bead of material so that the added material selectively produces a solid object. The properties of the extruded material can significantly affect the speed, precision, and quality of producing a 3D object. As such, the majority of 3D printers limit the extruded material to a single substance. Changing the material at various points of production to form more complex composites, although possible, is not desirable due to the significant time it takes to re-tool the extruder head and make the appropriate adjustments to achieve a high quality composite object. Accordingly, it may be desirable to develop techniques that speed up the process, particularly, an extruder head assembly capable of producing complex composites without re-tooling.

BRIEF SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its purpose is to present some concepts of one or more embodiments in a simplified form as a prelude to the more detailed description that is presented later.

In some embodiments, an extruder head for a printer includes a first distribution channel with an entrance and an exit; a second distribution channel with an entrance and an exit; a priming chamber disposed at the exit of the second distribution channel; a heating element disposed along the second distribution channel and near the priming chamber; and a nozzle disposed at an exit of the priming chamber.

In some embodiments, an active molding system includes a printer having an extruder head; and a shaping actuator configured to follow a displacement of the extruder head, wherein the shaping actuator includes: a pressure regulator configured to maintain a defined pressure applied to an exposed layer of material, and a foot unit that shapes the exposed layer of material; and a controller configured to control the printer and the shaping actuator.

In some embodiments, a method of injection molding a composite material includes forming, using a printer, an object on a support structure, wherein the object includes one or more porously accessible voided regions; enclosing the object in a mold that includes an injection mechanism attached to the mold; and injecting a material to fill the one or more porously accessible voided regions with the mold.

In some embodiments, a coaxial extruder head for a printer includes a distribution channel with an entrance and an exit; a priming chamber that surrounds the distribution channel, wherein the priming chamber comprises an outlet and a first inlet; a heating element connected to the priming chamber; and a nozzle connected to the outlet of the priming chamber, wherein the nozzle converges from the outlet of the priming chamber to an orifice of the nozzle, wherein the exit of the distribution channel is disposed at the orifice of the nozzle.

In some embodiments, a method of winding a composite filament to form a composite material includes rotating a mandrel about an ordinate axis, wherein the mandrel forms a 3D structure; moving a filament winding head in a direction parallel to the ordinate axis, wherein the filament winding head includes a coaxial extruder head; winding a filament core and a viscous liquid around the mandrel to form the composite material.

In some embodiments, a method of winding a composite filament to form a layered composite structure includes rotating the mandrel about an ordinate axis, wherein the mandrel forms a 3D structure; moving a filament winding head in a direction parallel to the ordinate axis, wherein the filament winding head includes: a printer head configured to extrude a viscous liquid through a nozzle; a filament guiding member connected to the printer head, wherein the filament guiding member is configured to guide a filament core through the viscous liquid at the nozzle; and winding the filament core and the viscous liquid around the mandrel to form a layered composite structure.

In some embodiments, a fiber dispensing head for a printer includes a fiber dispenser configured to dispense a fiber onto a sublayer; a nozzle connected to the fiber dispenser and configured to eject a stream of particles onto the fiber; and a laser connected to the fiber dispenser and configured to heat the particles at a focal point to adhere the fiber and sublayer to form a new layer.

In some embodiments, a method of extruding material includes forming a first support structure made of a first material and a second support structure made of a second material, wherein a region between the first and second support structures is devoid of material and the bulk material is insoluble; disposing a highly soluble material in the region between the first and second support structures; extruding an insoluble material over the highly soluble material; and dissolving the highly soluble material.

In some embodiments, a method of forming a filament winding layered structure includes forming a 3D-print structure on a surface of a cylinder using a highly soluble material to form a mandrel; rotating the mandrel about an ordinate axis; moving filament winding head in a direction parallel to the ordinate axis; winding a filament around the mandrel and the first and second endcap to form a layered composite structure; placing a first endcap 525 over a first end of the layered composite structure; placing a second endcap over a second end of the layered composite structure, wherein the second endcap includes: an inlet hole between an outside surface of the second endcap and a region inside the layered composite structure; and an outlet hole between an outside surface of the second endcap and a region inside the layered composite structure; and injecting a solvent into the inlet hole of the second endcap, wherein the solvent dissolves highly soluble material and exits the outlet of the second endcap.

In some embodiments, an insertion actuator for a printer includes a motor; a driver connected to the motor, wherein the motor is configured to actuate the driver; and two or more idler bearings configured to apply a load to a portion of a filament positioned between a surface of the driver and a surface of the two or more idler bearings.

In some embodiments, a method of forming a material structure on a surface of an object includes depositing a first material at a first location on the surface in a first direction; depositing a second material at a second location different from the first location on the surface in the first direction, wherein depositing the second material at the second location forms a cavity region between the first material deposited in the first location and the second material; and depositing a third material within the cavity region in a third direction different from the first direction and the second direction to form the material structure on the surface of the object.

BRIEF DESCRIPTION OF THE FIGURES

For a better understanding of the various described embodiments, reference should be made to the description below, in conjunction with the following figures in which like reference numerals refer to corresponding parts throughout the figures.

FIG. 1D illustrates components of a controller for a printer system in accordance with some embodiments of the present disclosure.

FIG. 11 illustrates a combined layup with bulk mold and an injection core formed using a coaxial extruder head in accordance with some embodiments of the present disclosure.

FIG. 18A illustrates an insertion actuator assembly in accordance with some embodiments of the present disclosure.

FIG. 18B illustrates a side view of an insertion actuator gear in accordance with some embodiments of the present disclosure.

DETAILED DESCRIPTION

The following description is presented to enable a person of ordinary skill in the art to make and use the various embodiments. Descriptions of specific devices, assemblies, techniques, and applications are provided as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

Various embodiments are described below relating to adaptive fabrication (e.g., three-dimensional printing) of complex composite materials. As used herein, "3D printing" refers to adding material layer-by-layer to produce a solid three-dimensional object that includes forming successive two-dimensional layers of predefined thicknesses. It should be recognized that "3D printing" is not limited to molds or planar geometry and, in fact, may break away from the two-dimensional plane that is associated with a successive layer to form complex 3D shapes.

As used herein, "layup" may refer to the vertical topography of a resultant structure formed by depositing successive layers. Often, "layup" is depicted as a vertical cross-section.

As used herein, the term "viscous" or "viscous liquid" may refer to a substance that is capable of flowing slowly and, in general, is representative of a pliable honey-like flow. In some instances this may refer to a glassy material with a temperature above its glass transition temperature. For example, materials such as polymers (e.g. plastics, silly putty, flux, beeswax), ceramics (e.g., silicates.), sugar glass (e.g. toffee, honey), amorphous metals (e.g., metallic-glasses), flow malleably above their respective glass transition temperature. In other instances this may refer to resins and epoxies that malleably flow under appropriate conditions (e.g. curing once exposed to ultraviolet radiation, elevated temperatures).

Figure 1A:
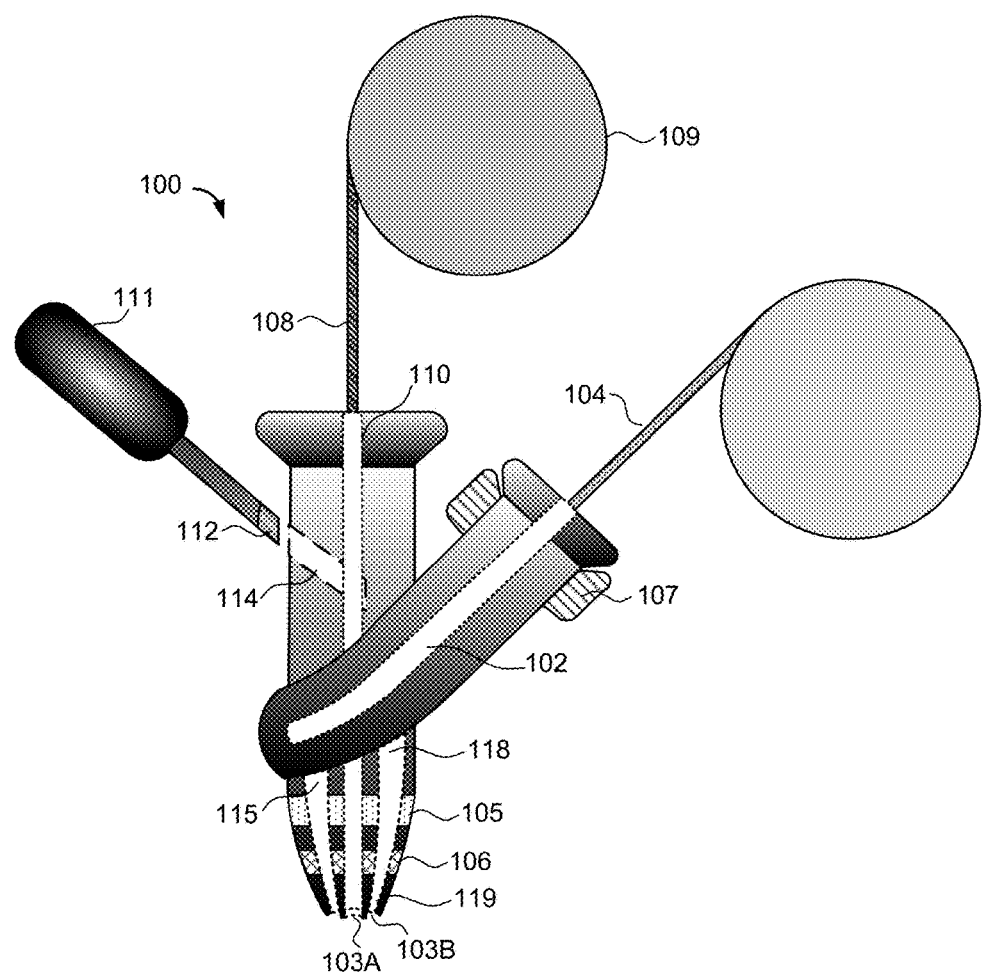
FIG. 1A illustrates a coaxial extruder head in accordance with some embodiments of the present disclosure.

With reference to FIG. 1A, extruder head 100 may include first distribution channel 110, second distribution channel 102, first nozzle 103A, second nozzle 103B, priming chamber 115, heating element 105, temperature sensor 106, cutting cavity 114, blade 112, actuator 111, and heat sink 107.

In some embodiments, extruder head 100 may be configured to extrude bulk 104, core 108, or a composite of core 108 that may be coaxially aligned or at least substantially coaxially aligned with bulk 104 cladding. Extruder head 100 directs core 108 through first distribution channel 110 to first nozzle 103A. Second distribution channel 102 directs bulk 104 to second nozzle 103B coaxially aligned with first nozzle 103A. First nozzle 103A and second nozzle 103B are aligned so that bulk 104 forms a cladding that envelops core 108 filament.

Most core 108 filaments are made from sufficiently stiff materials (e.g. thermoplastics, metals) that are easily inserted and directed through first distribution channel 110. For flexible core 108 filaments (e.g., carbon fiber threads, Kevlar threads), core 108 filament may be stiffened (e.g., braided, coated) to facilitate the mechanical insertion from the entrance of first distribution channel 110 to first nozzle 103A.

Figure 1B:
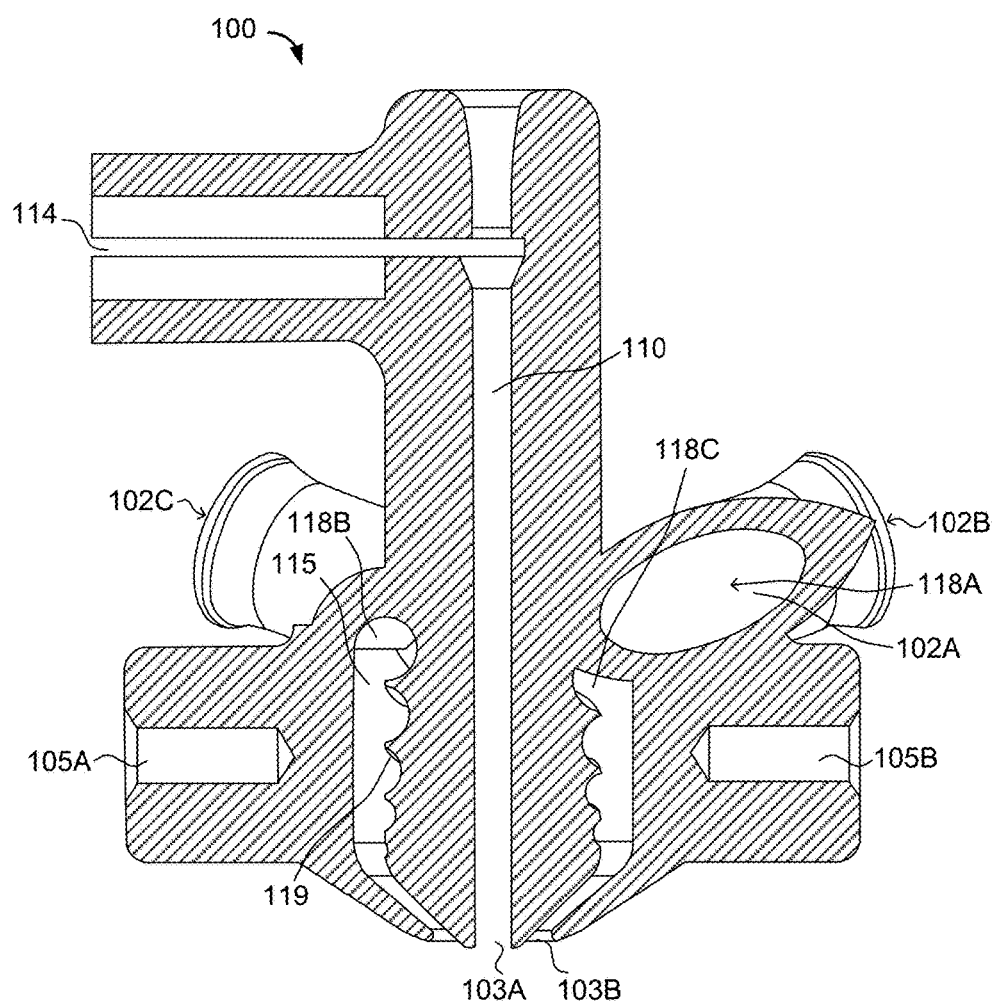
FIG. 1B illustrates a cross section of a coaxial extruder head in accordance with some embodiments of the present disclosure.
Figure 1C:
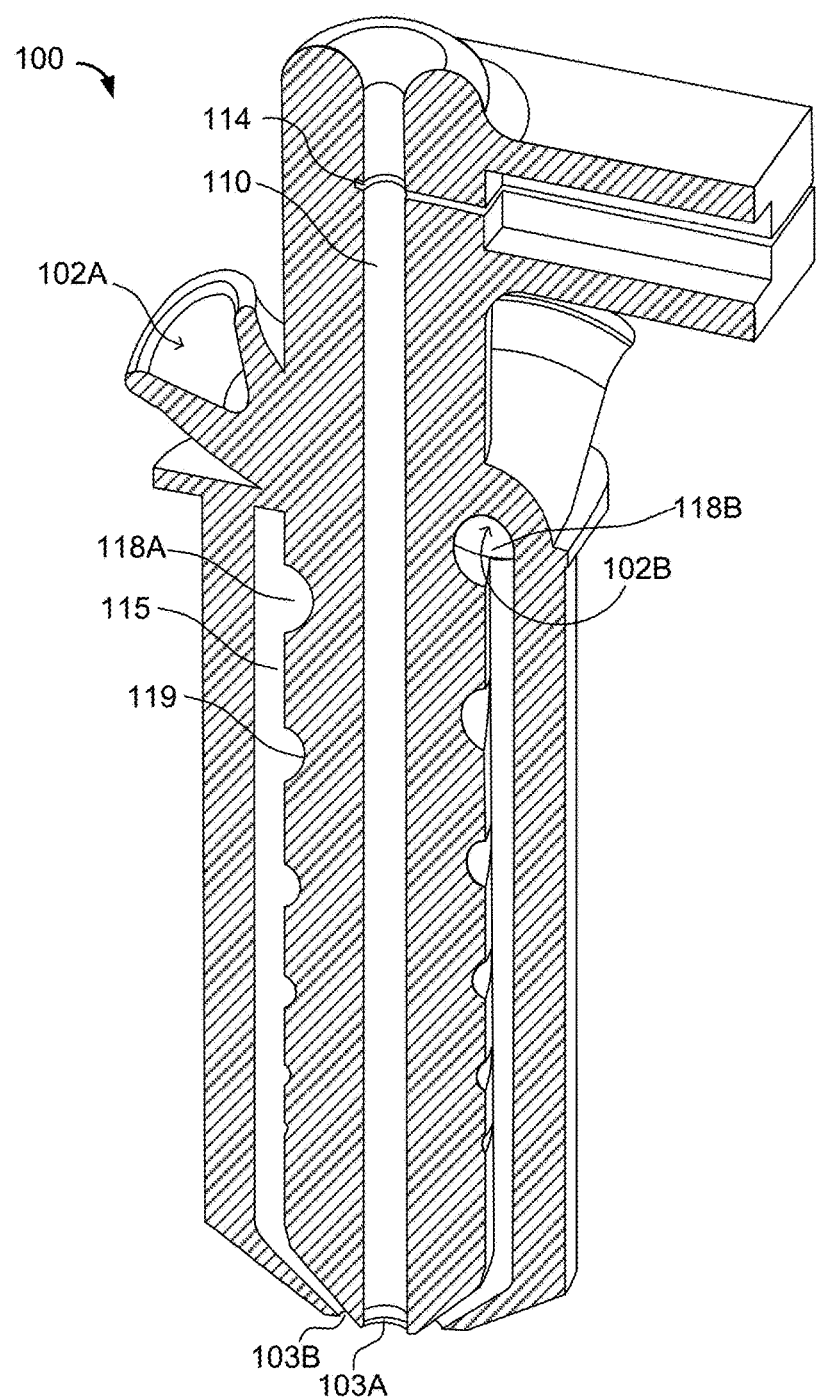
FIG. 1C illustrates a cross section of coaxial extruder head in accordance with some embodiments of the present disclosure.

As depicted in FIGS. 1A-1C, first distribution channel 110 is cylindrical and straight, which facilitates to direct core 108 filament. Some embodiments, curve or taper (e.g., funnel-like) at least a portion of first distribution channel 110. Usually, the tapered portion is disposed at the entrance of first distribution channel 110, which beneficially assist to direct core 108 filament to the exit of first nozzle 103A. It should be appreciated that distribution channel 110 is not limited to taper or cylindrical shapes. For example, distribution channel 110 may have a hexagonal prism shape, rectangular prism shape.

Like core 108 filaments, many bulk 104 filaments are made from sufficiently stiff materials (e.g. thermoplastics) that are easily inserted and direct through second distribution channel 102. Flexible bulk 104 filaments (e.g., epoxy resin, clay) may be stiffened (e.g., coated) to facilitate the mechanical insertion from the entrance of second distribution channel 102 to second nozzle 103B.

Like core 108 filaments, second distribution channel 102 is not limited in shape but may have a hexagonal prism shape, rectangular prism shape. As depicted in FIG. 1A, second distribution channel 102 tapers in a funnel-like shape that contours around first distribution channel 110 to conform to and ultimately merge with priming chamber 115. In some instances, the merge region between second distribution channel 102 and priming chamber 115 extends over an elongated volume. For example, in FIG. 1B, each of second distribution channel 102A, third distribution channel 102B, and fourth distribution channel 102C merge with priming chamber 115 over an elongated volume that conically tapers helically around first distribution channel 110 and diminishes as the helical taper approaches second nozzle 103B. Likewise, FIG. 1C depicts priming chamber 115 merging with both second distribution channel 102A and third distribution channel 102B over an elongated volume that conically tapers helically around first distribution channel 110 and diminishes as the helical taper approaches second nozzle 103B.

With reference to FIGS. 1A-1C, distribution channel 110 is coaxially aligned with second nozzle 103B, which minimizes eccentricity of extruded core 108 with respect to bulk 104 cladding. For example, in FIG. 1A, the entrance to second distribution channel 102 is inclined at an acute angle with respect to the entrance to distribution channel 110. The acute angle assists to minimize friction between bulk 104 filament and the walls of priming chamber 115. It should be recognized that the entrance angle is not limited to acute angles. For example, some embodiments may prefer to dispose the entrance to second distribution channel 102 from the top (0° angle) or prefer to dispose the entrance to second distribution channel 102 from the side (90° angle).

In some embodiments, an insertion actuator (e.g., filament driver) mechanically forces bulk 104 filament into second distribution channel 102 and into priming chamber 115. Heating element 105 thermally connects to priming chamber 115 and heats bulk 104 filament above its glass transition temperature. Inlet 118 of bulk 104 into priming chamber 115 forces a coaxial bead 113 through second nozzle 103B disposed at outlet 119 of priming chamber 115. As depicted in FIG. 1A, heat sink 107 is disposed along second distribution channel 102. Heat sink 107 assists to dissipate heat away from the entrance of second distribution channel 102 to ensure that bulk 104 remains stiff by keeping the temperature of bulk 104 filament below the glass transition temperature as bulk 104 filament enters second distribution channel 102. In some embodiments, second distribution channel 102 is bisected into two sections with a thermal insulator that separates a hotter second distribution channel 102 from a cooler second distribution channel 102.

In some embodiments, distribution channel 110 extends into priming chamber 115 and exits at or near the opening to second nozzle 103B from priming chamber 115. This ensures that core 108 filament exits at the geometric center of second nozzle 103B in a coaxial configuration. Further, this ensures that core 108 is free of bulk 104 and clear of any obstructions when extruding the core bead 113B.

As depicted in FIGS. 1A-1C, some embodiments recess second nozzle 103B above first nozzle 103A. Recessing second nozzle 103B may beneficially prevent core 108 from impinging on the edge of second nozzle 103B and may facilitate a more symmetrical distribution of bulk 104 along extruded bulk 104 filament at more extreme angles. Other embodiments recess first nozzle 103A within priming chamber 115, which may assist to draw out flexible core 108 as viscous bulk 104 passes through second nozzle 103B. In some embodiments, first nozzle 103A and second nozzle 103B are disposed in the same plane, which assists to draw out flexible core 108 filaments as viscous bulk 104 passes through second nozzle 103B and may provide a more symmetrical distribution of bulk 104 coaxially aligned with core 108 of extruded bead 113 over a range of angles.

Some embodiments include a first insertion actuator (e.g., filament driver) disposed above the entrance of first distribution channel 110 that draws core 108 filament from core filament reel 109 and inserts core 108 filament into the entrance of first distribution channel 110. As depicted in FIG. 1A, some embodiments include a single inlet 118 to priming chamber 115, with a second insertion actuator (e.g., filament driver) configured to insert first bulk 104 (e.g., cladding material) into a single inlet 118 of priming chamber 115. For instance, FIG. 1A depicts second distribution channel 102 that provides a single inlet 118 to priming chamber 115.

Some embodiments include two inlets to priming chamber 115, with a third insertion actuator (e.g., filament driver) that inserts second bulk 104 (e.g., cladding material) into second inlet 118B of priming chamber 115. For instance, FIG. 1C depicts second distribution channel 102A and third distribution channel 102B with two inlets to priming chamber 115. As depicted in FIG. 1C, second distribution channel 102A and third distribution channel 102B are disposed symmetrically 180° apart from each other and tilted at an angle of approximately 75° with respect to entrance of first distribution channel 110. In some embodiments, each inlet 118A, 118B spirals inward so as to eliminate edges, which can increase friction between bulk 104 filament and priming chamber 115 wall as bulk 104 filament enters priming chamber 115.

Some embodiments include three inlets 118A, 118B, 118C to priming chamber 115, with a fourth insertion actuator (e.g., filament driver) configured to insert third bulk 104 (e.g., cladding material) into third inlet 118C of priming chamber 115. As depicted in FIG. 1B, each of second distribution channel 102A, third distribution channel 102B, and fourth distribution channel 102C is disposed symmetrically 120° apart from the other and each is tilted at an angle of approximately 75° with respect to entrance of the first distribution channel 110.

In some embodiments, the inlets spirals inward so as to eliminate edges, which can increase friction between bulk 104 filament and priming chamber 115 wall as bulk 104 filament enters priming chamber 115. This positions bulk 104 filament to be in more contact with the outer wall of priming chamber 115 and closer to heating elements 105A and 105B connected to the side of the outer wall of priming chamber 115. It should be appreciated that other embodiments may include more than three inlets each with a respective insertion actuator (e.g., filament driver) configured to insert bulk 104 (e.g., cladding material) into an inlet of priming chamber 115.

Further, bulk 104 filament (e.g., cladding) inserted into two or more inlets 118A, 118B, of priming chamber 115 may be different. For example, first bulk 104 filament may include a first co-reactant material and second bulk 104 filament may include a second co-reactant material. Insertion of first bulk 104 filament through first inlet 118A and insertion of second bulk 104 filament through second inlet 118B mixes both the first co-reactant material and second co-reactant material within priming chamber 115 to facilitate a reaction (e.g., cure, harden).

To assist in homogeneous mixing, each of bulk 104 filament (e.g., cladding), the inner wall of priming chamber 115 may have helical grooves 119 disposed around the inner coaxial wall of priming chamber 115 that corresponds to the merge region between priming chamber 115 and second distribution channels 102A, 102B, 102C, that extends over an elongated volume depicted in FIG. 1B and FIG. 1C. Helical grooves 119 provide additional surface area, which increases heat transfer to bulk 104 filament (e.g., cladding) and facilitates a homogeneous mixture. In other embodiments, priming chamber 115 may have grooves helically disposed around the outer wall of priming chamber 115.

As depicted in FIG. 1B and FIG. 1C, helical grooves 119 each spiral in the same direction. In some instances, one or more helical grooves 119 may spiral in opposite directions with respect to another.

As depicted in FIG. 1A, one or more heating elements 105 are disposed near second nozzle 103B with one or more temperature sensors 106 dispose at or close to second nozzle 103B. Some embodiments include additional heating elements 105 disposed along second distribution channel 102 to provide a more uniform thermal gradient across second distribution channel 102. In some embodiments, additional temperature sensors 106 are disposed along second distribution channel 102. Temperature sensors 106 may be electronic sensors (e.g., thermocouples, thermistors, diodes, transistors) or mechanical sensors (e.g., bimetal thermostat) or any thermal sensing device, that can be monitored via a computer or controller 160 (e.g. black body radiation detector).

Some embodiments include cutting cavity 114 that guides blade 112 to cut core 108 filament as desired. As depicted in FIGS. 1A-1C, cutting cavity 114 is disposed above priming chamber 115 and positioned to bisect first distribution channel 110. Some embodiments connect blade 112 to actuator 111 (e.g., solenoid), which is electronically controlled to cut or perforate core 108 filament as desired. In other embodiments, blade 112 is disposed at the end of first distribution channel 110 near first nozzle 103A to cut or perforate core 108 filament, which facilitates cutting extruded core 108 at the end of bead 113.

In some embodiments, core 108 filament is impregnated with an epoxy resin as a matrix binder to increase the strength and promote adhesion to deposited bead 113. In some instances, heating elements 105 are disabled so as not to prematurely cure the epoxy matrix binder. Other embodiments include using ultraviolet or infrared laser 116 to provide sufficient energy to cure the epoxy matrix binder. Ultraviolet or infrared laser 116 is positioned to target the curing region of extruded bead 113 without impeding the movement of coaxial extruder head 100.

To assist in reducing the thermal exposure of core 108 filament and heat reduction along core 108 filament, some embodiments include an insulator (e.g. thermal barrier) interposed between the exit and an entrance of first distribution channel 110.

In some instances, first distribution channel 110 is disposed alongside second distribution channel 102 with first nozzle 103A in close proximity to second nozzle 103B (e.g., first nozzle 103A and second nozzle 103B are side by side). This configuration facilitates extruding separate materials of core 108 filament or bulk 104 without re-tooling, but does not extrude a coaxial bead where bulk 104 cladding is coaxially aligned with core 108 filament. Instead, core 108 filament is disposed to the side of bulk 104. In this instance, bulk 104 cladding does not fully envelop core 108 filament. To ensure that bulk 104 cladding fully envelops core 108 filament, some embodiments rotate coaxial head 100 such that bulk 104 extrudes over core 108 filament. Other embodiments forcibly press core 108 into bulk 104 using shaping actuators 201 in active molding process 200.

With reference to FIG. 1B, coaxial extruder head 100 includes second distribution channel 102A, third distribution channel 102B, and fourth distribution channel 102C that merge with priming chamber 115 over a relatively short elongated volume. The elongation increases the internal friction of the viscous fluid proportional to the length of the priming chamber 115. For example, coaxial extruder head 100 of FIG. 1B has less internal friction than coaxial extruder head 100 depicted in FIG. 1C, which includes second distribution channel 102A and third distribution channel 102B that merge with priming chamber 115 over a relatively long elongated volume. The increase in internal friction increases the force threshold insertion actuator exerts to push bulk 104 filament into second distribution channel 102.

To avoid severing bulk 104 filament from too much applied, some embodiments include insertion actuator 700 (FIGS. 18A and 18B) configured to grip bulk 104 filament against a surface of first idler bearing 722 (FIG. 18A) at a first tangential angle and a surface of second idler bearing 724 (FIG. 18A) at a second tangential angle different from the first tangential angle.

Coaxial extruder head 100 may be configured to form homogenous bulk beads 113A. Bulk bead 113A may be from one or more bulk 104 filaments mixed within priming chamber 115 and extruded as bulk bead 113A.

Referring to FIG. 1D, components of controller 160 for printer 150 are illustrated in accordance with some embodiments of the present disclosure. For example, controller may include processor 165, memory 170, and storage 175. In some embodiments, processor 165 may be configured to process or compute instructions and/or data. Further, memory 170 may be a physical device configured to store information temporarily or permanently. Additionally, storage 175 may be computing hardware that is used for storing, porting and extracting data files and objects. Storage 175 may hold and store information both temporarily and permanently, and can be internal or external to a computer, server or any similar computing device. In addition, bus 180 and bus connections 181 and 182 may facilitate communication between various components of printer 150.

Figure 2A:
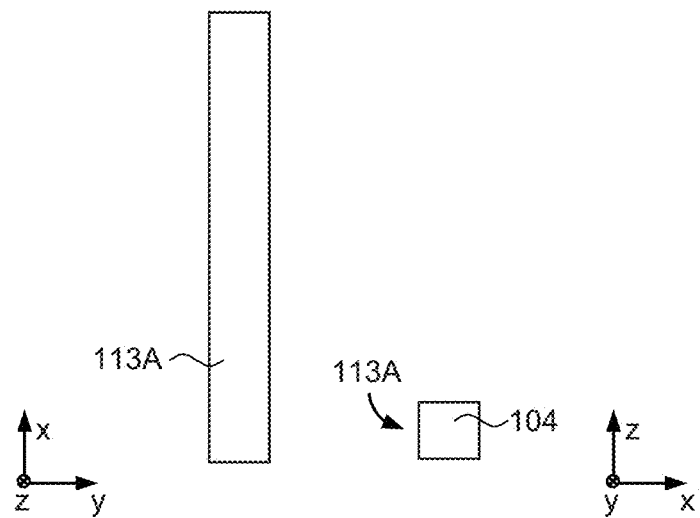
FIG. 2A illustrates a top view cross section of an extruded bulk bead and a side view cross section of an extruded bulk bead in accordance with some embodiments of the present disclosure.

FIG. 2A depicts cross sections of bulk bead 113A from the top view and from the side view. Insertion actuator 700 (FIGS. 18A and 18B) mechanically forces bulk 104 into second distribution channel 102 while core 108 filament is held back. In this instance, extruder head 100 extrudes bulk 104 to provide deposited bead 113A with the material properties (e.g., stiffness and strength) associated with bulk 104. Accordingly, the material properties (e.g., stiffness and strength) are the same in all directions (e.g., isometric) for single layered deposited bead 113A.

Figure 2B:
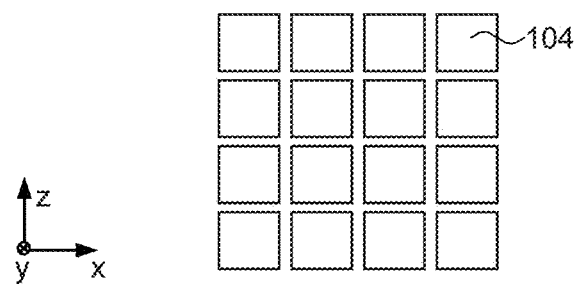
FIG. 2B illustrates a side view cross section layup of an extruded bulk bead in accordance with some embodiments of the present disclosure.

FIG. 2B depicts a side view cross section of a layup structure of bulk beads 113A. To form this structure, extruder head 100 deposits beads 113A of viscous bulk 104 over previous layers. Heat exchanged from viscous liquid bulk 104 to surrounding cooler bulk 104 bonds viscous liquid bulk 104 to adjacent cooled beads 113. The bond formed between adjacent beads 113A may be weaker than single bulk bead 113A and susceptible to delamination. In some embodiments, the strength of layup of deposited bulk bead 113A is anisometric.

Coaxial extruder head 100 may be configured to form core bead 113B, which may be made from one or more core 108 filaments.

Figure 3A:
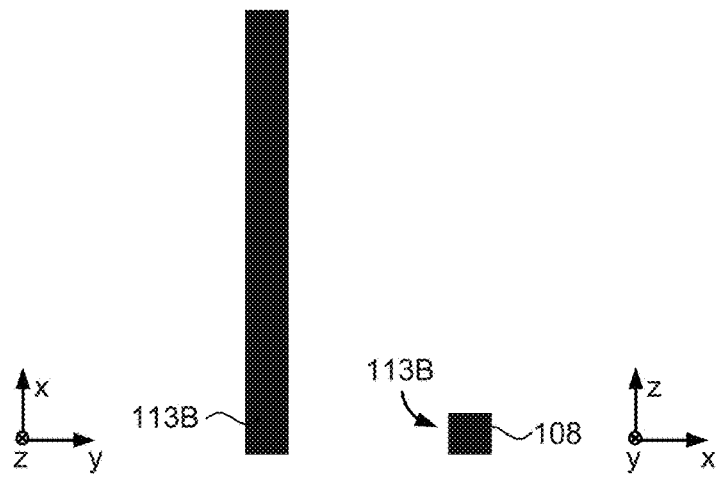
FIG. 3A illustrates a top view cross section of an extruded core bead and a side view cross section of extruded core bead in accordance with some embodiments of the present disclosure.

FIG. 3A depicts cross sections of core bead 113B from the top view and from the side view. In this instance, priming chamber 115 near the opening to nozzle 103B is de-primed to facilitate the extrusion of core 108 filament without resistance from viscous liquid bulk 104. To de-prime near the opening to nozzle 103B, insertion actuators 700 (FIGS. 18A and 18B) mechanically retract bulk 104, which draws viscous bulk 104 away from second nozzle 103B. De-priming sufficiently removes bulk 104 in region of the end of priming chamber 115 near the opening to second nozzle 103B. Once de-primed, insertion actuators 700 (FIGS. 18A and 18B) mechanically force core 108 filament through the first distribution channel 110 and out first nozzle 103A. In this instance, extruder head 100 extrudes core 108 filament to deposit beads 113B with the material properties (e.g., stiffness and strength) associated with core 108 filament.

In some embodiments, core 108 filaments is a metal (e.g., copper, solder, and/or alloy). In some embodiments core 108 filaments have one or more fibers (e.g., carbon fiber, fiberglass, Kevlar). In some instances, core 108 has a much greater stiffness and strength along the longitudinal directions of the fibers than the transverse. Accordingly, the stiffness and strength of each deposited bead 113B may be anisometric.

Figure 3B:
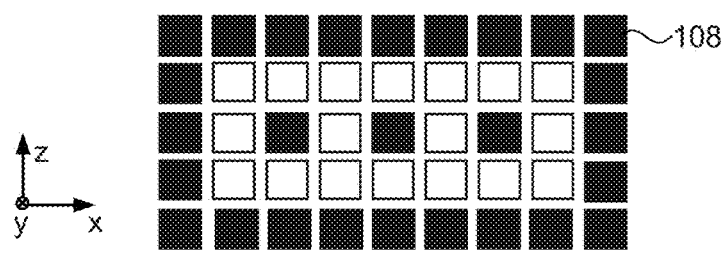
FIG. 3B illustrates a side view cross section layup of an extruded core bead in accordance with some embodiments of the present disclosure.
Figure 3C:
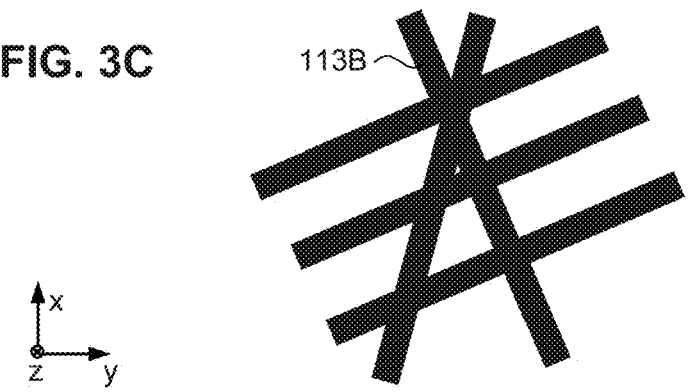
FIG. 3C illustrates a top view of a planar layer with core beads positioned according to some embodiments of the present disclosure.

FIG. 3B depicts a side cross section of layup structure of core beads 113B. Extruder head 100 deposits core 108 filament over previous layers and between deposited bulk 104 layers. Because core 108 filament is weaker along the transverse directions, fiber filaments 108 are often deposited such that the longitudinal directions of some fiber filaments 108 are oriented at 90° and 45° with respect to each other, as depicted in FIG. 3C. This ensures a more overall isotropic stiffness and strength for fiber core layup. In some embodiments, core 108 filament may be impregnated with an epoxy as a matrix binder to increase the strength and promote adhesion between fibers when deposited.

Coaxial extruder head 100 may be configured to form homogenous bulk beads 113A. Bulk bead 113A may be from one or more bulk 104 filaments mixed within priming chamber 115 and extruded as bulk bead 113A.

Coaxial extruder head 100 may be configured to form bead 113C that includes core 108 filament and bulk 104 cladding. In some instances, core 108 is a metal and bulk 104 is an electrically insulated material (e.g., thermoplastic).

In other instances, core 108 is a metal and bulk 104 is a ceramic clay or porcelain clay. In other instances core 108 has one or more fibers (e.g., carbon fiber, fiberglass, Kevlar) and bulk 104 is a thermoplastic. In other instances core 108 has one or more fibers (e.g., carbon fiber, fiberglass, Kevlar) and bulk 104 is an epoxy.

Figure 4A:
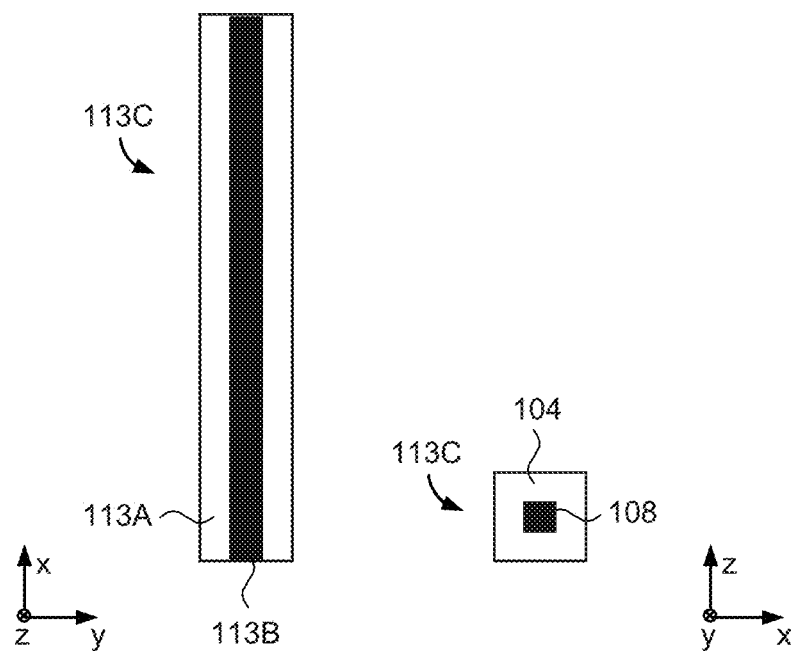
FIG. 4A illustrates a top view and side view cross section of an extruded composite bead in accordance with some embodiments of the present disclosure.

FIG. 4A depicts cross sections of composite bead 113C from the top view and from the side view. In this instance, a first insertion actuator mechanically forces core 108 filament into distribution channel 110 and a second insertion actuator forces bulk 104 into second distribution channel 102. The resultant composite bead 113C includes core 108 and bulk 104 cladding. Composite bead 113C provides regions with the material properties (e.g., stiffness and strength) associated with both a core 108 and a bulk 104.

One benefit of encasing core 108 filament with bulk 104 (e.g., cladding) is that bulk 104 protects core 108 and isolates core 108 from the environment. For fiber cores 108, the stiffness and strength of composite bead 113C may be anisometric since many fiber core 108 filaments exhibit a much greater strength along the longitudinal directions (e.g., carbon fiber, fiberglass, Kevlar) of core 108 than the transverse direction. In this instance, the strength in the transverse direction is greatly improved to bulk 104 cladding. The extruded composite bead 113C has an anisometric distribution.

Figure 4B:
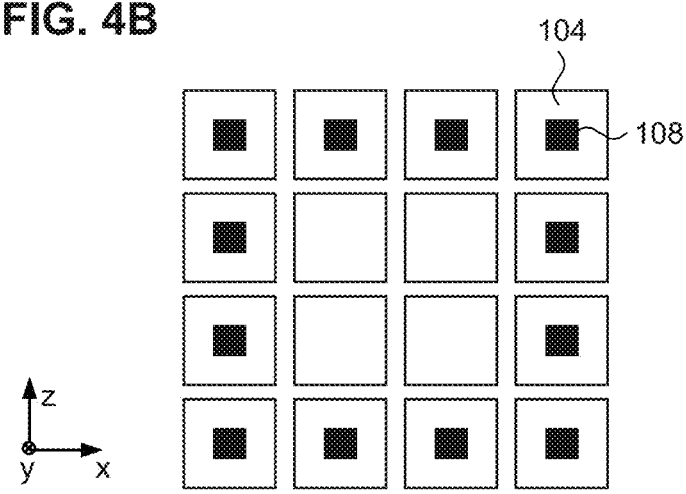
FIG. 4B illustrates a side view cross section of a combined layup that includes interior and exterior regions formed layer by layer using a coaxial extruder head in accordance with some embodiments of the present disclosure.

FIG. 4B depicts a side view cross section of composite layup formed using coaxial extruder head 100. The layup includes bulk beads 113A surrounded by composite beads 113C that have core 108 and bulk 104 cladding. Extruder head 100 deposits both viscous bulk beads 113A and composite beads 113C of viscous bulk 104 (e.g. cladding) over previous layers. Heat exchanged from viscous bulk 104 (e.g. cladding) to the surrounding cooler bulk 104 bonds the viscous bulk 104 (e.g. cladding) to the adjacent cooled beads 113. The bond formed between adjacent beads 113, however, is generally weaker than the single extruded bead 113 of bulk of FIG. 4A and can delaminate. Accordingly, the strength of the layup of the overall deposited bulk beads 113A and composite beads 113C may be anisometric and may be susceptible to delamination between adjacent beads.

Figure 5A:
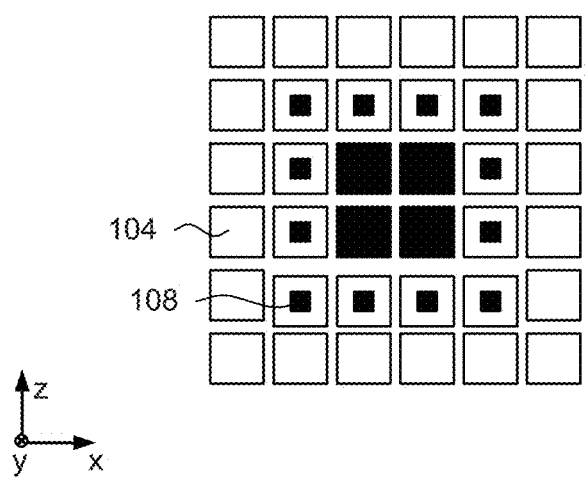
FIG. 5A illustrates a side view cross section of a combined layup including interior and exterior regions formed layer by layer using coaxial extruder head in accordance with some embodiments of the present disclosure.
Figure 5B:
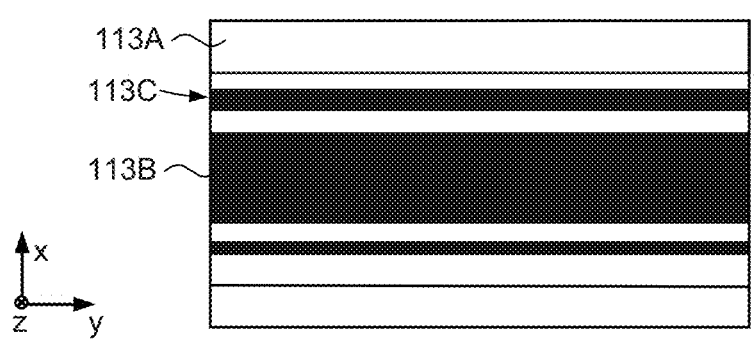
FIG. 5B illustrates a top view cross section of a combined layup including interior and exterior regions formed layer by layer using coaxial extruder head in accordance with some embodiments of the present disclosure.

Coaxial extruder head 100 may be configured to form complex materials with regions of bulk beads 113A, regions of core beads 113B, and regions of composite beads 113C as desired. FIG. 5A and FIG. 5B depict cross sections for a layup of a side and top view, respectively, for a complex composite material structure that implements a core region of core beads 113B, a hybrid region of composite beads 113C, and protected by a bulk bead 113A cladding. In this instance, the interior of the structure has an inner core of fiber core 108 and thermoplastic bulk 104 material for bulk bead 113A. In some embodiments, inner core fiber core beads 113B may include porously accessible voided regions 215 that are encased by both composite bead 113C and bulk bead 113A cladding. It should be appreciated that the material comprising core 108 and bulk 104 is not limited to fibers (e.g., carbon fiber, fiberglass, Kevlar) and thermoplastics (e.g., HDPE, PLA) but may include other materials (e.g., metals, porcelain clay).

As described above, extruder head 100 may be configured to construct, layer by layer, each of the above structures without having to retool. It should be appreciated that numerous other structures may be constructed by combining any of the above structures.

Figure 6:
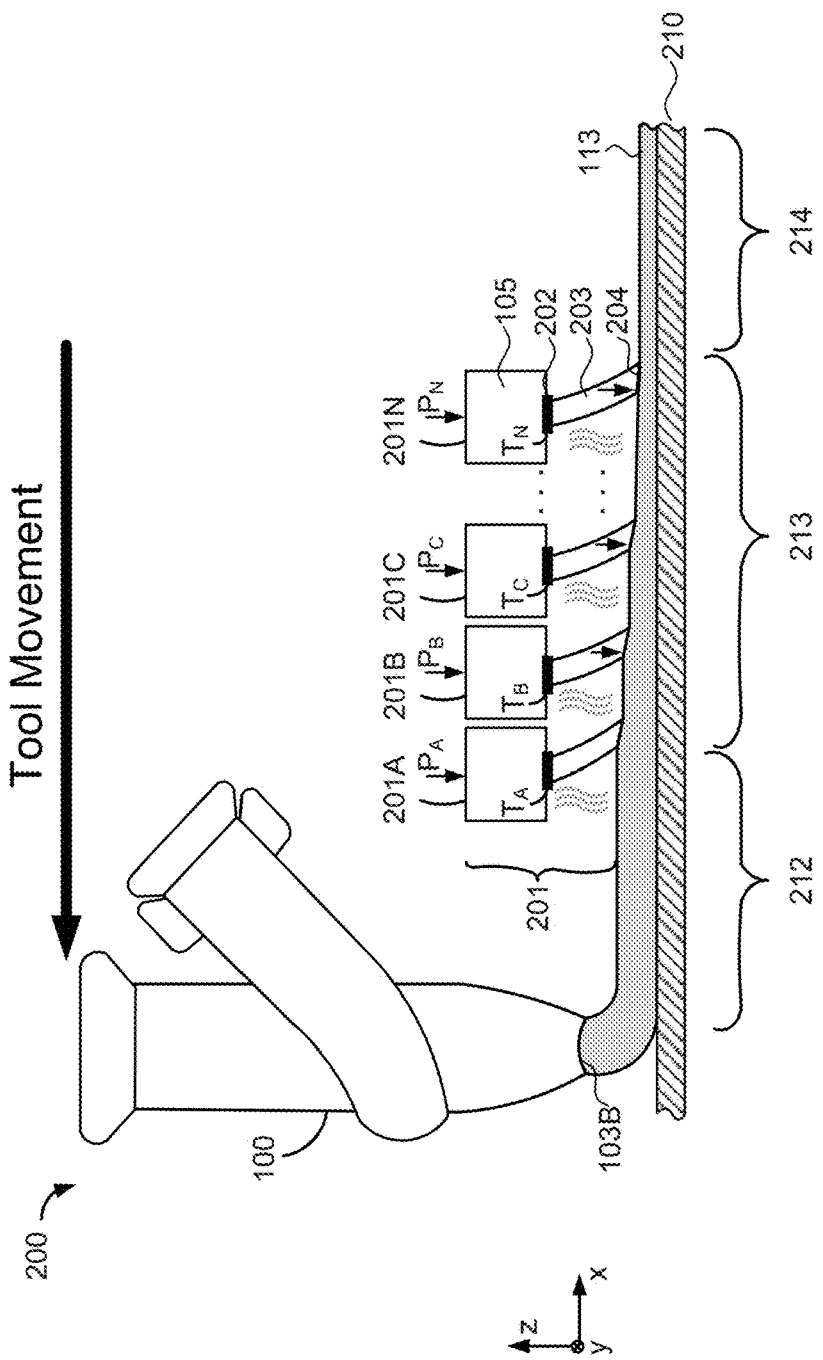
FIG. 6 illustrates an additive manufacturing system in accordance with some embodiments of the present disclosure.

Active molding process 200 refers to forming and shaping techniques that occur while three-dimensional printing. These techniques apply pressure and temperature to the newly extruded bead in order to increase bonding between extruded layers and improve the surface quality. With reference to FIG. 6, active molding process 200 includes one or more shaping actuators 201 configured to follow coaxial extruder 100 and apply both temperature and pressure to bulk bead 113A or core bead 113B or composite bead 113C. This beneficially compresses bead 113 to the previous layer bead 113.

In some embodiments, one or more shaping actuators 201 form a sequence of independent shaping actuators 201, where each shaping actuator 201 is configured to independently maintain a temperature and a pressure to extruded bead 113. Each shaping actuator 201 includes pressure regulator 203 coupled to foot unit 204, temperature regulator 202, and heating element 105.

FIG. 6 depicts raw bead region 212, active molded region 213, and conditioned region 214. Raw bead region 212 is the shape of bead 113 before active shaping actuators 201 condition the shape of bead 113. Active molding region 213 includes four independent shaping actuators 201 that sequentially compresses bead 113. First shaping actuator 201A exerts pressure, $P_A$, second shaping actuator 201B exerts pressure, $P_B$, third shaping actuator 201C exerts pressure, $P_C$, and Nth shaping actuator 201 exerts pressure, $P_N$.

Inclusive on each shaping actuator 201 is pressure regulator 203 that senses and applies a desired pressure. In some embodiments, pressure regulator 203 directly measure the applied pressure (e.g., via strain gauges) and deliver an electrical signal to controller 160. Some embodiments include an electrical solenoid actuation as the pressure regulator that engages via controller 160. In this instance, the pressure each shaping actuator 201 exerts is proportional to the current driven through the solenoid. Other direct measurement embodiments include a strain gage on each shaping actuator 201 to deliver an electrical signal to controller 160 to determine the applied pressure at each shaping actuator 201.

Figure 7:
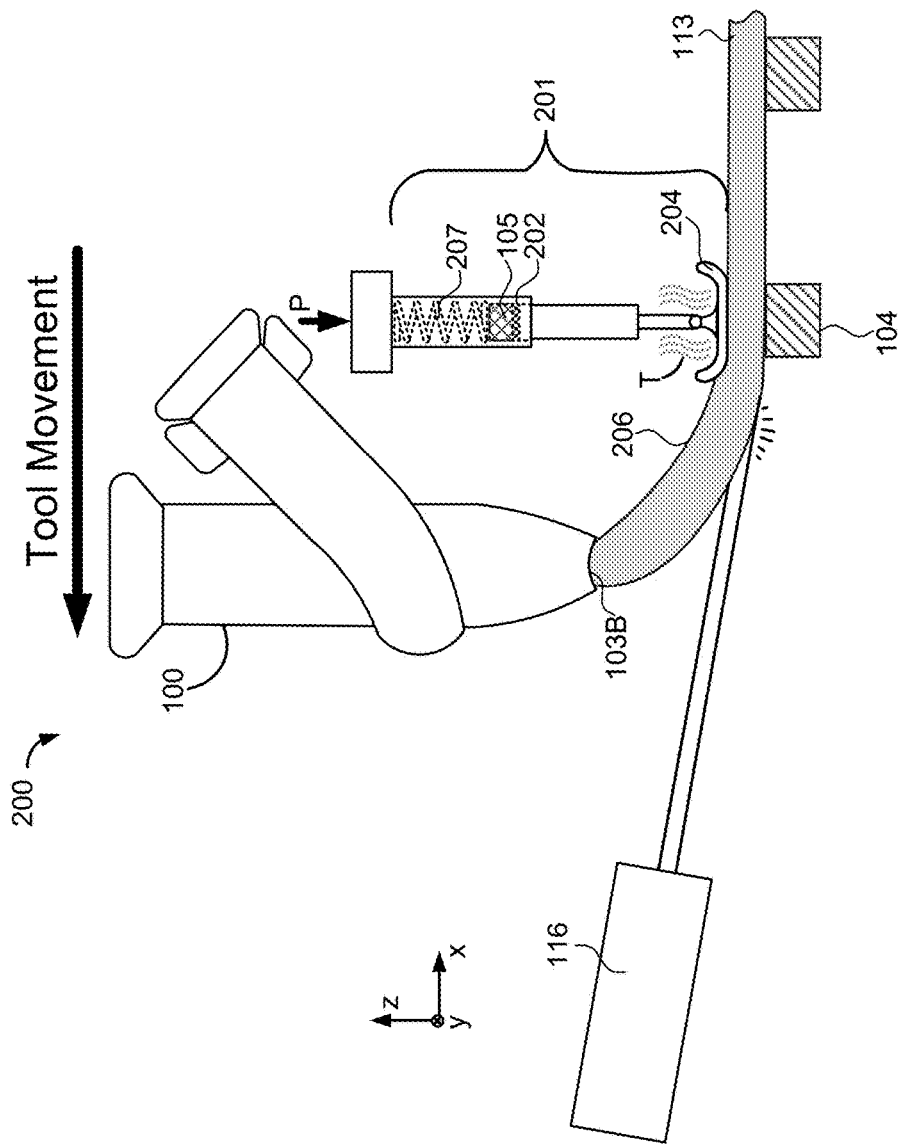
FIG. 7 illustrates an additive manufacturing system in accordance with some embodiments of the present disclosure.
Figure 8:
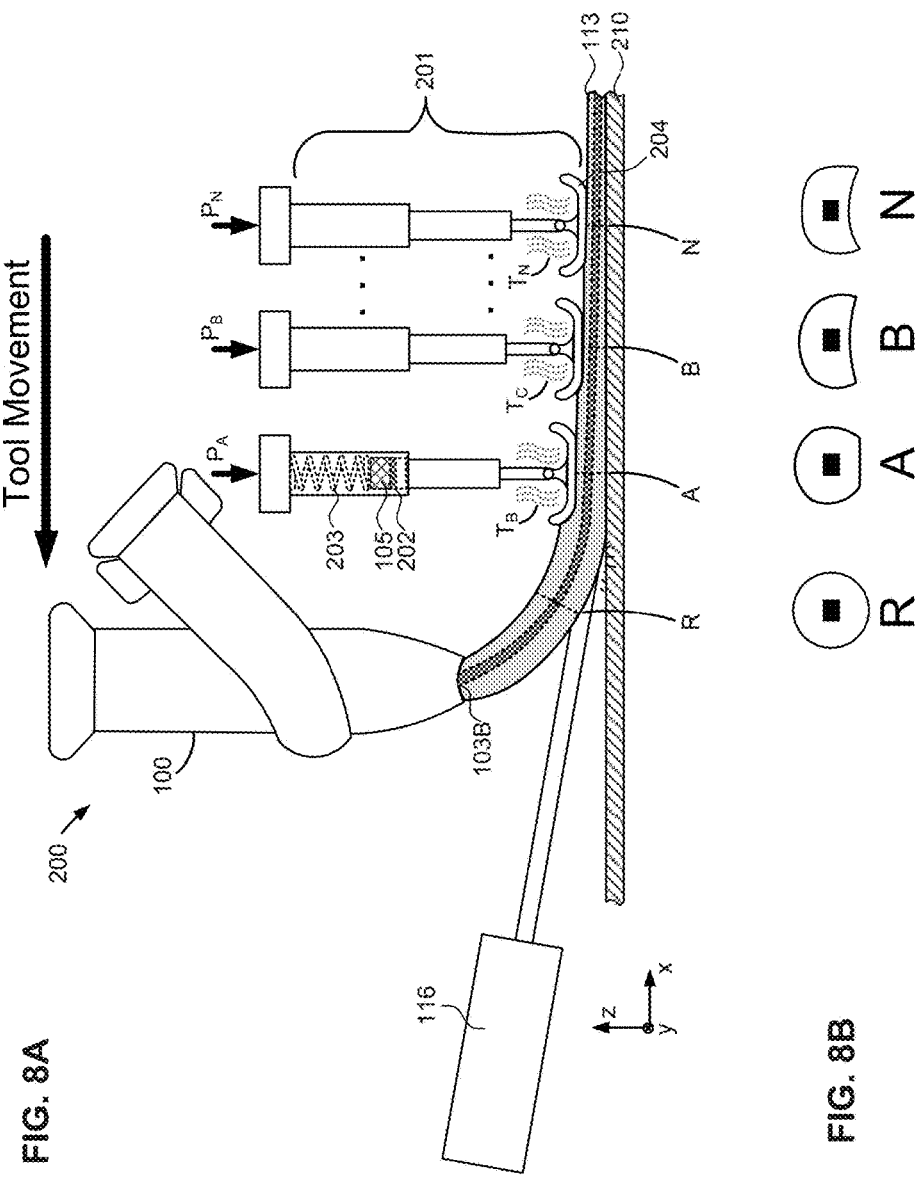
FIG. 8A illustrates an additive manufacturing system in accordance with some embodiments of the present disclosure.
FIG. 8B illustrates cross sections for a composite bead in accordance with some embodiments of the present disclosure.

In some embodiments, pressure regulators 203 may indirectly determine the applied pressure (e.g., via spring displacement). For example, as depicted in FIG. 6, pressure regulator 203 is made of finger-like springs that bend to engage with extruded bead 113 and exert an evenly distributed pressure. The pressure each shaping actuator 201 exerts is proportional to the spring displacement that may be determined using simple calibration procedures. In these instances, the pressure increases by moving shaping actuator 201 closer to extruded bead 113 and decreases by moving shaping actuator 201 away from extruded bead 113 (e.g., F=Kx, F is force, K is a constant, and x is displacement). In some embodiments, pressure regulator may include a telescoping/coil spring actuator 207 that exerts force proportional to the spring displacement as depicted in FIGS. 7 and 8. Other embodiments include hydraulic actuation that stiffens in proportion to the hydraulic fluid as pressure regulator 203. Other embodiments include a screw actuator as pressure regulator 203 that is controlled by rotating a shank using servo motors (e.g., calibrated displacement measurement).

Shaping actuator 201 also includes shaping actuator 201 that shapes extruded bead 113. As depicted in FIG. 6, shaping actuator 201 is disposed at the tips of the finger-like springs that make indirect contact with extruded bead 113. In some embodiments, foot unit 204 of each shaping actuator 201 has different shapes. For example, shaping actuator 201 is disposed at the tips of the finger-like springs has different slopes that successively shape extruded bead 113 with each pass. In some instances, foot unit 204 of each shaping actuator 201 is used to adjust surface roughness of extruded bead 113 or alternatively embed objects (e.g. wires, threads, fibers) into the surface of bead 113 that is subsequently covered with bead 113. For example, first shaping actuator 201 may be shaped to press core 108 filament into bulk 104 with subsequent feet 204 shaped to form a smooth compact surface.

As mentioned above, shaping actuator 201 regulates the surface smoothness. Some embodiments include a coarsened roller to roughen the surface, which beneficially increases the adherence between layers by increase the surface area and contour the surface. Other embodiments include a fine roller to shaping actuator 201 that creates a polished surface finish. Some embodiments include knife to shaping actuator 201 that trims material for either better adherence or finer surface finish.

Pressure pulses may be added to one or more shaping actuator 201. For example, some embodiments include pulse actuator connected to controller 160 that is configured to provide sonic or ultrasonic pulse to extruded bead 113. In most instances, the sonic or ultrasonic pulses increases bond strength between extruded bead 113 and the previous layer.

In addition to exerting pressure and shaping extruded bead 113, each shaping actuator 201 includes temperature regulator 202 that maintains a defined temperature to thermoform extruded bead 113. FIG. 6 depicts first shaping actuator 201 providing temperature, $T_A$, second shaping actuator 201 providing temperature, $T_B$, third shaping actuator 201 providing temperature, $T_C$, and the Nth shaping actuator 201 providing temperature, $T_N$. Temperature regulators 202 are disposed above finger-like springs 203. In this instance, each temperature regulator 202 includes heating element 105 that transfers heat through finger-like spring 203 and shaping actuator 201 to extruded bead 113. Heated shaping actuator 201 increases pliability of extruded bead 113 and increases bond strength between extruded bead 113 and the previous layer. It should be appreciated, however, that temperature regulators 202 may be disposed in any appropriate location on foot unit 204. For example, in some embodiments, temperature regulators 202 may be disposed on shaping actuator 201.

As depicted in FIG. 6, each shaping actuator 201 subsequently compresses extruded bead 113 throughout active molding process 200 such that raw region 212 between second nozzle 103B and first shaping actuator 201 is the least compressed and extruded bead 113 after the Nth shaping actuator 201 is the most compressed. It should be recognized that the temperature and pressure profile of shaping actuators 201 may vary as appropriate to the extruded material and application. For example, in some embodiments the temperature and pressure associated with each shaping actuator 201 may be constant (e.g. $T_1=T_2=T_3=T_N$ and $P_1=P_2=P_3=P_N$).

In some embodiments, each temperature regulator 202 includes temperature sensor 106 disposed on each shaping actuator 201, preferably disposed on a position of shaping actuator 201 nearest to extruded bead 113. Temperature sensors 106 may be electronic sensors (e.g., thermocouples, thermistors, diodes, transistors) or any thermal sensing device, that can be monitored via a computer or controller 160 (e.g. black body radiation detector). A computer or controller 160 may be used to control other components to the printer, such as, but not limited to, controlling the mechanical insertion of the bead feedstock (e.g., bulk 104 and core 108) for coaxial extruder head 100, controlling actuation of extruder head 100, and/or controlling shaping actuators 201.

As depicted in FIG. 7, extruder head 100 may extrude malleable thermosetting resins 206. In some instances, shaping actuators 201 provide sufficient energy to activate and regulate the curing process. For example, FIG. 7 depicts shaping actuator 201 with foot unit 204 that connects to a pressure regulator 203 including a telescoping/coil spring actuator 207. Heating elements 105 as part of temperature regulator 202 are connected above pressure regulator 203 to deliver thermal energy through foot unit 204 to thermosetting resin 206. For example, foot unit 204 forms an elongated camber shape with a curved front tip and a flat midsection to provide more surface area in contact with thermosetting resin 206 to spread heat more evenly across the surface of thermosetting resin 206. The amount of thermal energy supplied by heating elements 105 of temperature regulator 202 may be increased or decreased via controller 160 to accelerate or moderate the curing process accordingly.

Other embodiments for camber shaped foot unit 204 may be used. In particular, some embodiments may use the rocker camber shape, or the flat shape. The camber has a slight upward curve in the middle of foot unit 204 that when unweighted, foot unit 204 contacts bead 113 at two contact points between the ends of foot unit 204. The rocker camber shape has a slight downward curve in the middle of foot unit 204 that when unweighted, foot unit 204 contacts bead 113 at one contact point between the ends of foot unit 204. Flat shaped foot units 204 have no curve when foot unit 204 is unweighted and contacts point between the ends of foot unit 204. Further, the tips of the camber shape may have a curve up in the front near the tip, or in the back near the tip, or both.

In some embodiments, shaping actuators 201 may include an air-blade mechanism that forces a constant stream of air that impinges on the surface of extruded bead 113. The velocity of the constant stream of air may be increased or decreased to regulate the amount of pressure applied to the surface of extruded bead 113. The constant stream of air may be heated at a specified temperature to transfer additional energy to extruded bead 113. In addition, the air-blade mechanism includes one or more nozzles that shapes the exiting constant stream of air. In some embodiments, the nozzles may have a circular exit hole with a focused non-dispersed air pattern. In some embodiments, the nozzles may have a circular exit hole that disperses the air pattern such that the air pattern forms a conical shape. In some embodiments, the nozzle may have a flat rectangular exit hole that disperses the air pattern such that the air pattern forms a rectangular prism-like shape.

As depicted in FIG. 8A, shaping actuator 201 delivers pressure applied across the surface of thermosetting resin 206 that compacts and shapes thermosetting resin 206 with each successive shaping actuator 201. The temperature and pressure profile of shaping actuators 201 may vary appropriately to the material properties of extruded thermosetting resin 206. In some embodiments, further heating thermosetting resin 206, accelerates the curing process and consequently decreases the malleability of extruded bead 113. Thus, the curing rate of extruded bead 113 may be proportional to the thermal gradient of extruded bead 113, so that the fastest curing rate occurs in the hotter areas near the contact region of the elongated foot unit 204 and the slowest curing rate occurs near the cooler areas near contact regions of previous layers.

To reduce any disproportionate curing rate, printer system of the present application may include a laser 116 to apply optical energy to areas of thermosetting resin 206 that contacts previous layers. As depicted in FIG. 7, ultraviolet laser 116 may be positioned to target a location near foot unit 204 of shaping actuator 201 to irradiate the surface of thermosetting resin 206 that contacts previous layers. In some embodiments, ultraviolet laser 116 may be a continuous beam where the intensity and total output power can be regulated appropriate to the material properties of extruded thermosetting resin 206. In some embodiments, ultraviolet laser 116 may include a pulsed beam with a specific intensity. In other embodiments, it may be beneficial to have a combination of continuous and pulse beam intensity from ultraviolet laser 116. It should be appreciated that laser 116 is not limited to output ultraviolet spectrum and may output power at any appropriate wavelength, such as infrared, visible, and/or deep ultraviolet. Further, a computer or controller 160 may be used to control the position and the output power of laser 116.

In some embodiments, the laser 116 is positioned to target bead 113 near first nozzle 103A or second nozzle 103B of extruder head 100. Often, targeting a location near first or second nozzle 103A, 103B provides sufficient stiffness in thermosetting resin 206 to facilitate bead placement. In other embodiments, multiple lasers 116 may be included to target regions of thermosetting resin 206 to facilitate bead placement and shaping, as well as, increase curing rates, and facilitate layer compaction. In some embodiments, for a wider target distribution heat lamps may be used.

FIG. 8A depicts, a 3D printer system that includes extruder head 100 configured to extrude malleable thermosetting resin 206 surrounding a core 108. As depicted, ultraviolet laser 116 targets a location near first nozzle 103A of extruder head 100 and is positioned to irradiate the surface of thermosetting resin 206 that contacts the previous deposited layer. The added energy provided by laser 116 complements the applied energy using shaping actuators 201 to actively mold extruded thermosetting resin 206 to previous layers.

FIG. 8B depicts the cross section of raw extruded bead 113 (e.g., at location R), the cross section shape after first shaping actuator 201A (e.g., at location A), the cross section shape after second shaping actuator 201B (e.g., at location B), and the cross section shape after Nth shaping actuator 201N (e.g., at location N).

As depicted in FIG. 8B, active molding process 200 shapes and contours thermosetting resin 206 to the surface of the previous layer. For example, the side view cross section of extruded raw bead 113 includes a square core 108 concentric to a circular thermosetting resin 206 cladding. In contrast, once bead 113 is compacted and shaped by first shaping actuator 201A thermosetting resin 206 of extruded bead 113 elongates in the longitudinal and transverse directions. Second shaping actuator 201B further compacts and elongates bead 113 in the longitudinal and transverse directions to form a more rectangular shape cross section with rounded corners. Last shaping actuator 201N forms the most compacted shape of bead 113 of FIG. 8A such that the cross section forms a rectangular shape that sufficiently contours to the previous surface and fills in void regions 215 such as the rounded corners.

Figure 9:
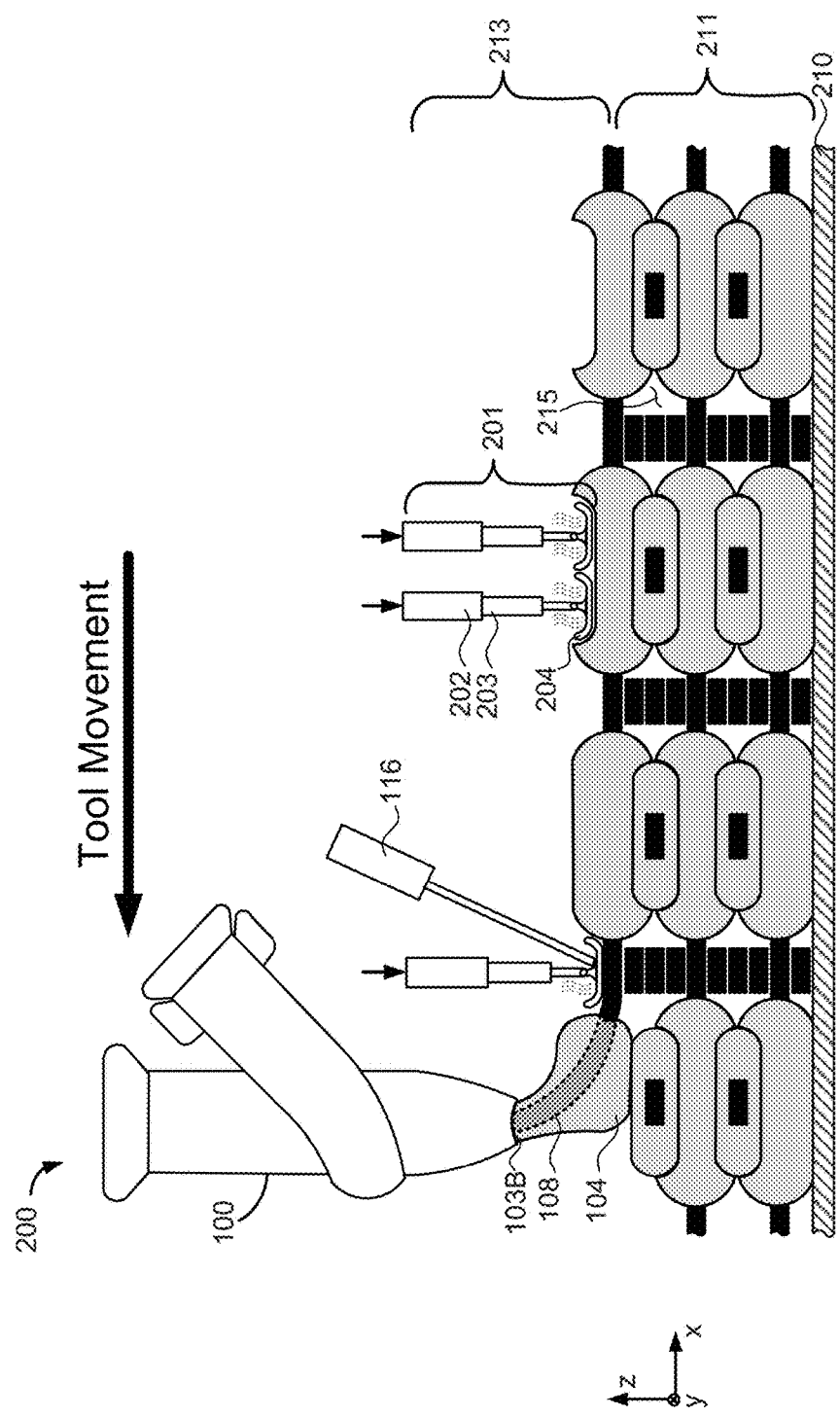
FIG. 9 illustrates a complex composite structure formed using a coaxial extruder head in accordance with some embodiments of the present disclosure.

One benefit in using extruder head 100 and shaping actuators 201 is that a printer system actively shapes complex hybrid structures without having to retool. In reference to FIG. 9, extruder head 100 extrudes core 108 and a cladding material to form hybrid composite structure 211. As depicted in FIG. 9, core 108 is pre-impregnated with epoxy resin that activates with ultraviolet light and bulk 104 axially forms a cladding around impregnated core 108.

In some embodiments, foot unit 204 of shaping actuators 201 is configured to engage and shape regions of extruded bead 113 that with pre-impregnated core 108. First shaping actuator 201 includes foot unit 204 that connects to pressure regulator 203 including an electrical solenoid actuator for fast actuation of first shaping actuator 201. This permits first shaping actuator 201 to engage and disengage from impregnated core 108 regions without impinging on adjacent cladding material along the longitudinal length of extruded bead 113.

As depicted in FIG. 9, active molding process 200 may use ultraviolet laser 116 to target extruded bead 113 in a region near shaping actuator 201. Ultraviolet laser 116 accelerates the curing of the epoxy to stiffen the epoxy while shaping actuator 201 presses core 108 against a previous layer of cured epoxy core 108.

Each remaining shaping actuator 201 of shaping actuators 201 is configured to engage with bulk 104 cladding. Each shaping actuator 201 has a telescoping/coil spring actuator 207 and a foot unit 204 that connects to a pressure regulator 203. Heating elements 105 from temperature regulator 202 are connected above pressure regulator 203 to deliver thermal energy through foot unit 204 to bulk 104 cladding. As depicted in FIG. 9, each remaining shaping actuator 201 presses against bulk 104 cladding and actively compacts and shapes the cladding to contour around previous layers.

Hybrid composite structure 211 includes voided regions 215 that are porously accessible to adjacent voided regions 215. In some embodiments, the inclusion of voided regions 215 reduces the weight of the overall hybrid material composite beneficially resulting in strong light-weight composites applicable in many mechanical and aeronautical designs. The inclusion of voided regions 215 is also applicable for designs that favor strong materials with high thermal insulative properties. In many instances, voided regions 215 of FIG. 9 may be filled with gases such as air, nitrogen, and/or argon, which may be realized by enclosing the entire 3D printing system in a sealed chamber filled with the desired gas.

Figure 10:
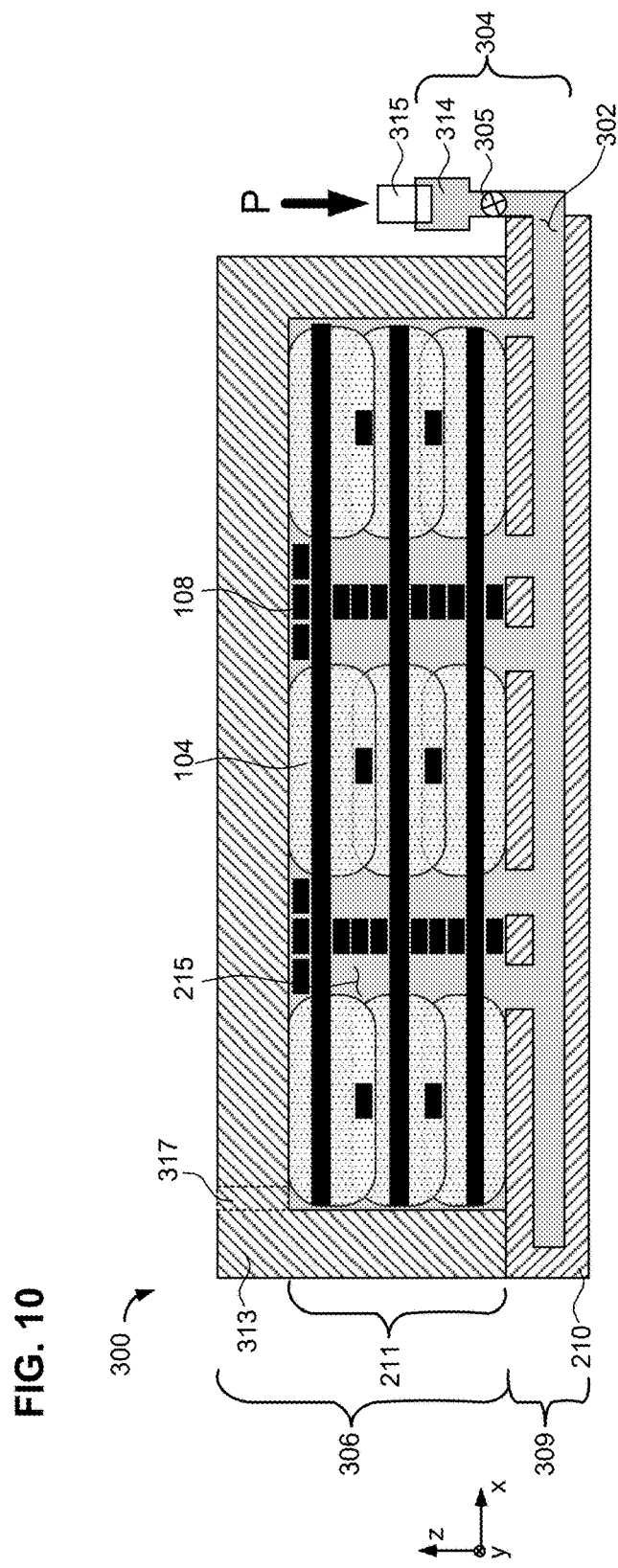
FIG. 10 illustrates a complex composite structure formed using a coaxial extruder head in accordance with some embodiments of the present disclosure.

In some embodiments, injection mechanism 304 may be included to inject a substance into porously accessible voided regions 215. For example, as illustrated in FIG. 11, hybrid composite structure 211 is disposed on an underlying support structure 210 that forms an A-side mold 309 similar to FIG. 10. FIG. 10 also depicts mold cavity 313 that forms a B-side mold 306 that seals with the A-side mold 309 to enclose the entire hybrid composite structure 211. Injection mechanism 304 is included on the A-side mold 309 with inlet 314 and outlet 317. Inlet 314 injects a substance into voided porous regions 215 of hybrid composite structure 211 while outlet 317 purges the air from voided regions 215. It should be appreciated that forming voided regions 215 that are porously accessible to injection mechanism 304 facilitates the injection molding process and reduces the likelihood of void pockets in the final product. Further, injecting bulk fluid 302 under pressure may assist in eliminating voided regions 215 especially for capillary sized voided regions 215.

In some embodiments, hybrid composite structure 211 is heated in an oven to a high-temperature in an oxygen-free environment until bulk 104 undergoes pyrolysis. Subsequent hybrid composite structure 211, once encased within mold cavity 313 and support structure 210, may be injected with a liquid metal to yield a complex alloy structure.

In some embodiments, the injected substance is an epoxy based secondary matrix that may include matrix strengthening fibers such as glass, carbon fiber, steel particles, nano-sized ceramic powders, and the like. In some embodiments, the injected substance is a sinterable wax that may include fine sinterable particles such as glass, ceramic powders, metallic powders, and/or semiconductor powders.

Coaxial extruder head 100 may also be configured to form structures with an internal framework (e.g. scaffold) that include void region 215 that are porously accessible. In some embodiments, void regions 215 with structures that are subsequently filled with bulk fluid 302 using injection mechanism 304 (e.g. injection molding, submersion, vacuum displacement).

One technique to inject bulk fluid 302 is to include outlet 317 and channel structure 314 as part of injection mechanism 304 in mold 300. As depicted in FIG. 11, bulk fluid 302 is inject via injection mechanism 304 to fill voided regions 215. In this instance, the structure depicted in FIG. 11 includes an inner core of core beads 113B enclosed in composite beads 113C that is encased by an exterior bulk beads 113A cladding. The topology further includes injection mechanism 304, which provides access between the outside of the exterior bulk shell 303 and the inner core region. During the injection process, bulk fluid 302 flows through channel structure 314 and pushes the ambient fluid (e.g., air, inert gas) out through outlet 317. Some embodiments include one or more outlets 317 to facilitate the outflow of ambient fluid (e.g., air, inert gas) from the structure.

Another technique to inject bulk fluid 302 is to include channel structure 314 to a hermetically seal structure without outlets 317 in mold 300. In this instance, channel structure 314 provides access between void regions 215 and the outside the structure. Connecting a vacuum pump and via injection mechanism 304 removes the ambient fluid (e.g., air, inert gas) from void regions 215 within the structure. Stopping valve 305 holds the vacuum within the structures. Connecting an infusion device 301 (e.g., syringe) filled with bulk fluid 302 to injection mechanism 304. Finally, unstopping valve 305 ingresses bulk fluid 302 and fills void regions 215 with bulk fluid 302. Sufficient bulk fluid 302 should be provided in the infusion device 301 (e.g., syringe) to adequately fill voided regions 215 within the hermetically sealed bulk 104 cladding.

Another technique to inject bulk fluid 302 is to submerse a structure in a container of bulk fluid 302. In this instance, the bulk fluid 302 or ambient fluid (e.g., air, inert gas) flows through either injection mechanism 304 or outlets 317 to fill void region 307A with bulk fluid 302. Once filled, valve 305 may be closed and one or more outlet 317 may be stopped prior to removing mold 300 from the container of bulk fluid 302.

In some embodiments, bulk fluid 302 is an epoxy or an epoxy that includes fibers. In some embodiments, bulk fluid 302 is a liquid metal. In some embodiments, the structure includes core beads that are porous fibers. It should be appreciated that the mechanism to inject the bulk fluid 302 is not limited to infusion device 301 (e.g., syringe) and other mechanism as are also possible, such as, but not limited to wicking, capillary action, and/or infiltration.

In some embodiments, the composite structure may form a temporary mold that is removed after the injection molding process. For example, in reference to the technique depicted in FIGS. 12A-12E, extruder head 100 may be configured to form A-side mold 309 and/or B-side mold 306 that may be used for injection molding to fill voided region 307A. As depicted in FIG. 12A, A-side mold 309 may be the support structure and may be made from thermoplastics, clays, and/or epoxy resins. B-side may be made from any removable material that may be formed into complex structures using extruder head 100. Removable materials may include dissolvable thermoplastic 311 such as ABS or high impact polystyrene (HIPS) that dissolves in liquid solution 310 (e.g., solvent) or compostable material that may be removed through microbial activation (e.g., biodegradable) such as polylactic acid (PLA), and/or polyglycolic acid (PGA).

Figure 12C:
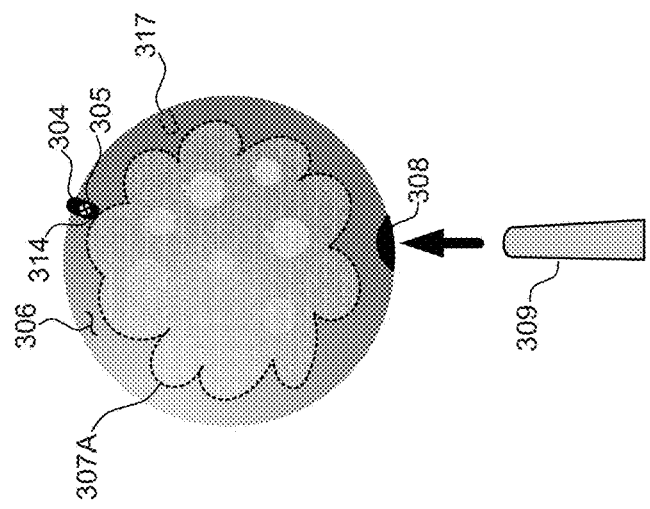
FIGS. 12A-12F illustrates an injection molding technique in accordance with some embodiments of the present disclosure.
Figure 12B:
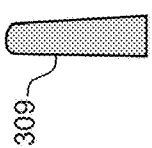
Figure 12A:
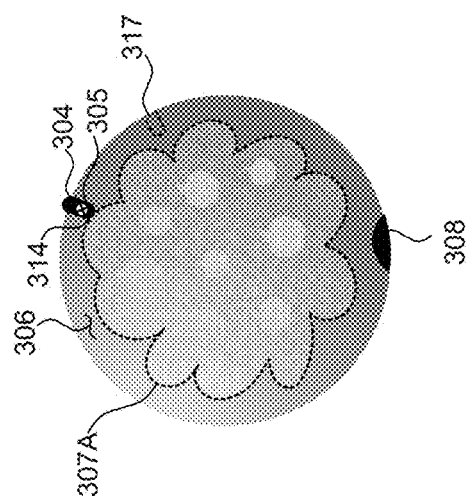
Figure 12F:
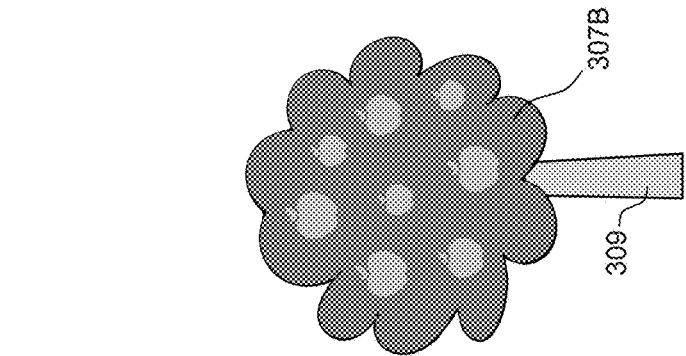

As depicted in FIG. 12C, A-side mold 309 and the B-side mold 306 form a mateable assembly 308 that includes injection mechanism 304 with inlet 314 and outlet 317. Inlet 314 inflows bulk fluid 302 into porous voided region 307A of B-side mold 306 made from HIPS while outlet 317 purges the air from voided region 307A. FIG. 12D depicts injecting bulk fluid 302 using injection mechanism 304. In this instance, bulk fluid 302 used in the injection mechanism is a thermal epoxy resin that cures after injection.

Figure 12E:
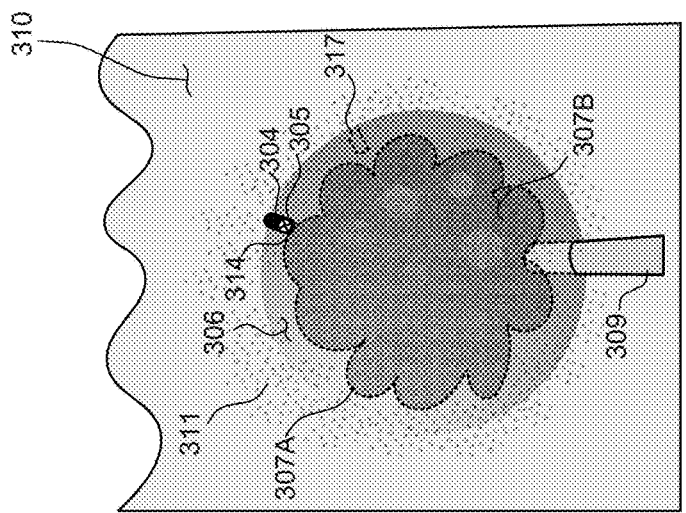
Figure 12D:
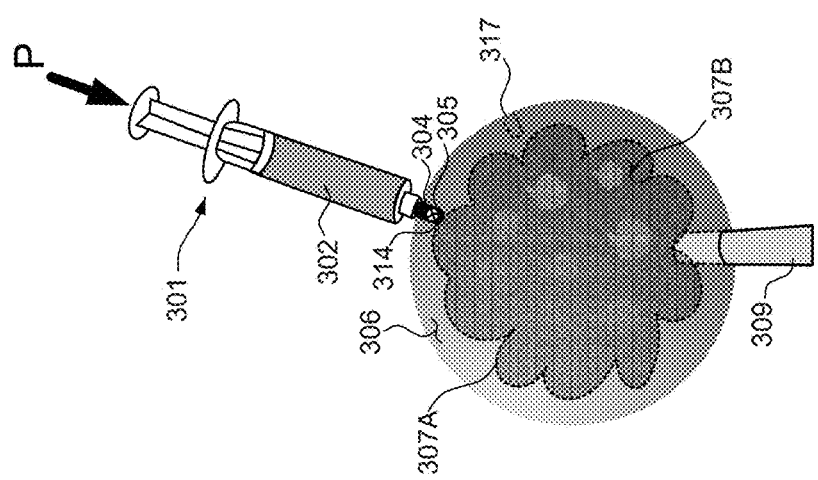

Once the epoxy is sufficiently cured, the assembly is placed into liquid solution 310 such as a limonene solution to remove the B-side mold 306, as depicted in FIG. 12E. The resultant object, as depicted in FIG. 12F forms a model tree where A-side mold 309 is integrated into the object to form the trunk of the model tree and the injected epoxy resin forms the foliage 307B. Note that intricate surface regions within the foliage are present and realized through the inclusion of material from B-side mold 306 that is removed by dissolution.

It should be appreciated that the material used to form the A-side 309 and B-side 306 mold are not limited to epoxies or thermoplastics. For example, in some embodiments, bulk 104 may be a ceramic clay or porcelain clay. The clay may be sintered in a subsequent step to form a strong heat-resistant A-side 309 or B-side 306 sintered mold 300. The injected fluid 302 may be a ceramic or metallic powder impregnated with a wax that when heated viscously flows into the porously accessible voided regions 215 of a sintered clay mold 300. A subsequent heating process can remove the wax from sintered clay mold 300. An additional sintering process sinters the ceramic or metallic powders within the sintered clay mold 300. The sintered clay mold 300 may be removed to reveal the object or left intact with the ceramic or metallic powder. Further, the metallic or ceramic powders may be mixed to form alloys or cermets once sintered.

In addition to a ceramic precursor clay or porcelain clay as a cladding material, some embodiments may use core made from metallic wire or semiconductor filament instead of a core 108 filament.

The material used in 3D printing may undergo subsequent processing steps to achieve the preferred material properties. For example, in some embodiments a thermoplastic may undergo pyrolysis in a high temperature and oxygen-free environment. In this instance, the high carbon residue from the pyrolysis is the desired structure that is obtained through the controlled breakdown of the thermoplastic that was formed through active molding process 200. It should be recognized that without the controlled oxygen-free environment, the thermoplastic may be significantly damaged once the temperature is elevated. Likewise, it should be recognized that each subsequent process, in general, should be subject to less energetic process step to ensure that the structure and materials are not damaged in the process flow. This reduction in energy for subsequent steps is referred as energy cascade.

Further, leveraging the energy cascade of subsequent processing techniques with active molding process 200 described above facilities the manufacturing of complex structures. For example, a monolithic brake rotor and wheel may be formed using coaxial extruder head 100 and shaping actuators 201 with subsequent controlled processing that follows the energy cascade. In some embodiments, the brake rotor may include three parts: a thermoplastic wheel reinforced with ultra-high molecular weight polyethylene fibers, a carbon fiber reinforced silicon carbide, SiC, brake rotor, and a titanium heat sink that attaches the wheel to the brake rotor. In this instance, the energy cascade indicates that titanium heat sink should be formed first, followed by the brake rotor, and the reinforced wheel.

To form the titanium heat sink, a titanium powder with a thermoplastic wax binder is extruded using extruder head 100 to form a structure that is about 20% wax. The structure is then heated in a controlled low oxygen, near vacuum environment at around 500° C. This step removes the wax and the thermoplastic undergoes pyrolysis. The titanium heat sink is then placed into a sintering oven at around 1400° C. to sinter the titanium into solid nonporous monolith titanium structure.

Next, the titanium heat sink is disposed on a support structure and extruder head 100 3D prints a brake rotor structure including a carbon fiber core 108 with thermoplastic cladding. In some instance, the thermoplastic may have pure carbon as an additive. The resultant structure is then heated in a controlled oxygen-free environment at around 500° C. to undergo pyrolysis and reduce the thermoplastic cladding to pure carbon. At this point, the brake rotor has titanium heat sink with a porous carbon/carbon composite rotor.

A dissolvable thermoplastic molding shell is 3D printed using extruder head 100 and shaping actuators 201 to form a mold around the porous carbon/carbon brake rotor. Then a high carbon content epoxy is injected into the porous brake rotor. After the epoxy cures at around 200° C., the thermoplastic is dissolved at around 100° C. using a limonene solvent. The resultant structure is then heated in a controlled oxygen-free environment at around 500° C. to undergo pyrolysis and reduce the thermoplastic cladding to pure carbon. At this point, the porosity of the carbon/carbon portion of the rotor is greatly reduced.

A stoichiometric balance is reached by submerging the porous carbon/carbon brake rotor in liquid silicon at around 1400° C. to infiltrate voided region 215 (e.g., porous capillary regions). More specifically, the liquid silicon flows through the porous capillaries and fills the voided region to about 99% solidity. In some instances, a portion of the porous carbon/carbon brake may be submersed in the liquid silicon to wick the non-submersed portion and infiltrates voided region (e.g., the porous capillaries) of the carbon/carbon brake. When the silicon cools, it bonds with the titanium and carbon matrix and forms a silicon carbide/carbon brake rotor.

The final process is to use extruder head 100 to 3D print an ultra-high molecular weight polyethylene reinforced PEI wheel onto the heat sink portion of the brake rotor.

As described above, the materials used may include metals, semiconductors, plastics, ceramics and the like, where each material is susceptible to a temperature as a processing step, (e.g., sintering, glass transition).

Figure 13:
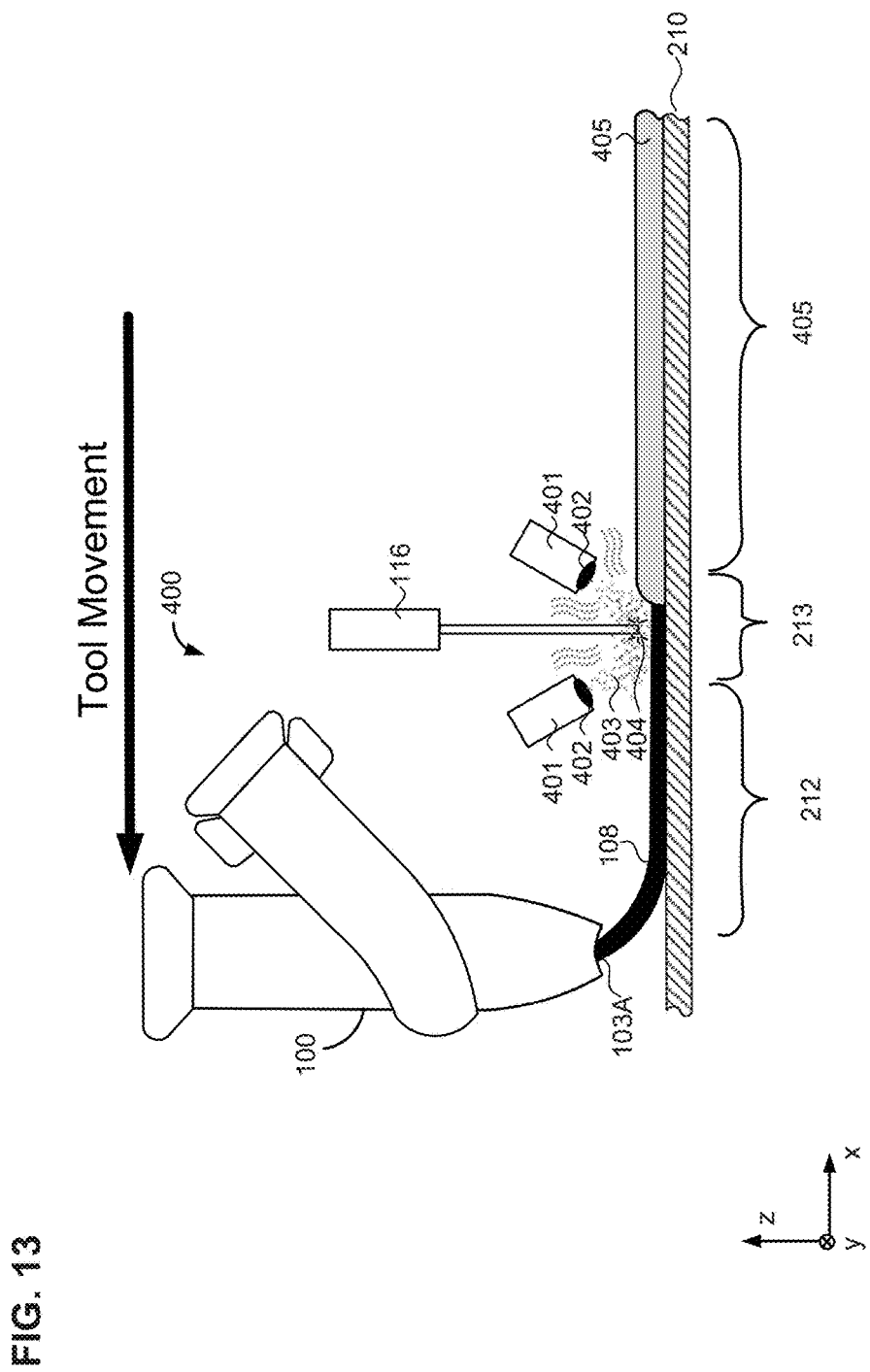
FIG. 13 illustrates an additive manufacturing technique in accordance with some embodiments of the present disclosure.

With reference to FIG. 13, fiber dispensing head 400 uses core 108 (e.g., fiber) dispenser to dispense core 108 (e.g., fiber) onto a sublayer. Particle nozzle injector 401, connected to core 108 (e.g., fiber) dispenser, is configured to eject stream of particles 403 onto core 108 (e.g., fiber). Laser 116, connected to core 108 (e.g., fiber) dispenser, is configured to heat particles 403 at a focal point 404 such that particles 403 adhere core 108 (e.g., fiber) and sublayer to form a new layer 405. In some embodiments, fiber dispensing head 400 includes motor 707 connected to a gripper-roller (e.g., idler bearings 722 and/or 724) and configured to rotate the gripper roller (e.g., idler bearing), to direct core 108 (e.g., fiber) from through first distribution channel 110 to the sublayer. In some embodiments, particles 403 ejected by particle nozzle injector 401 includes metal.

As depicted in FIG. 13, some embodiments may have more than one particle nozzle injector 401. Some embodiments that have more than one particle nozzle may eject different particles 403. In some embodiments, the heat generated by laser 116 melts particles 403 ejected by particle nozzle injector 401. For example, particles 403 ejected from one particle nozzle injector 401 may include solder and second particle nozzle injector 401 may include flux. The heat generated by laser 116 may flow the solder over core 108 (e.g., fiber).

This technique may also be used to produce alloys. For example, to produce a layer of brass, the ejected particles 403 from one particle nozzle injector 401 may include copper and second particle nozzle injector 401 may include zinc. Once laser heated, the copper and zinc melt to form brass over core 108 (e.g., fiber).

In some embodiments, laser 116 outputs infrared spectrum. Further, in some embodiments, laser 116 may not have sufficient power to melt particles 403. In these instances, the heat generated by laser 116 sinters particles 403 ejected by particle nozzle injector 401. This may be beneficial in instances of creating porous objects that may be filled through capillary action. For example, sintering the ejecting nano-sized metallic particles 403 provides porously accessible void regions within an object. Subsequently, submerging the object in a liquid metal, the porously accessible void regions fill with the liquid metal to form a composite over core 108 (e.g., fiber).

Figure 14:
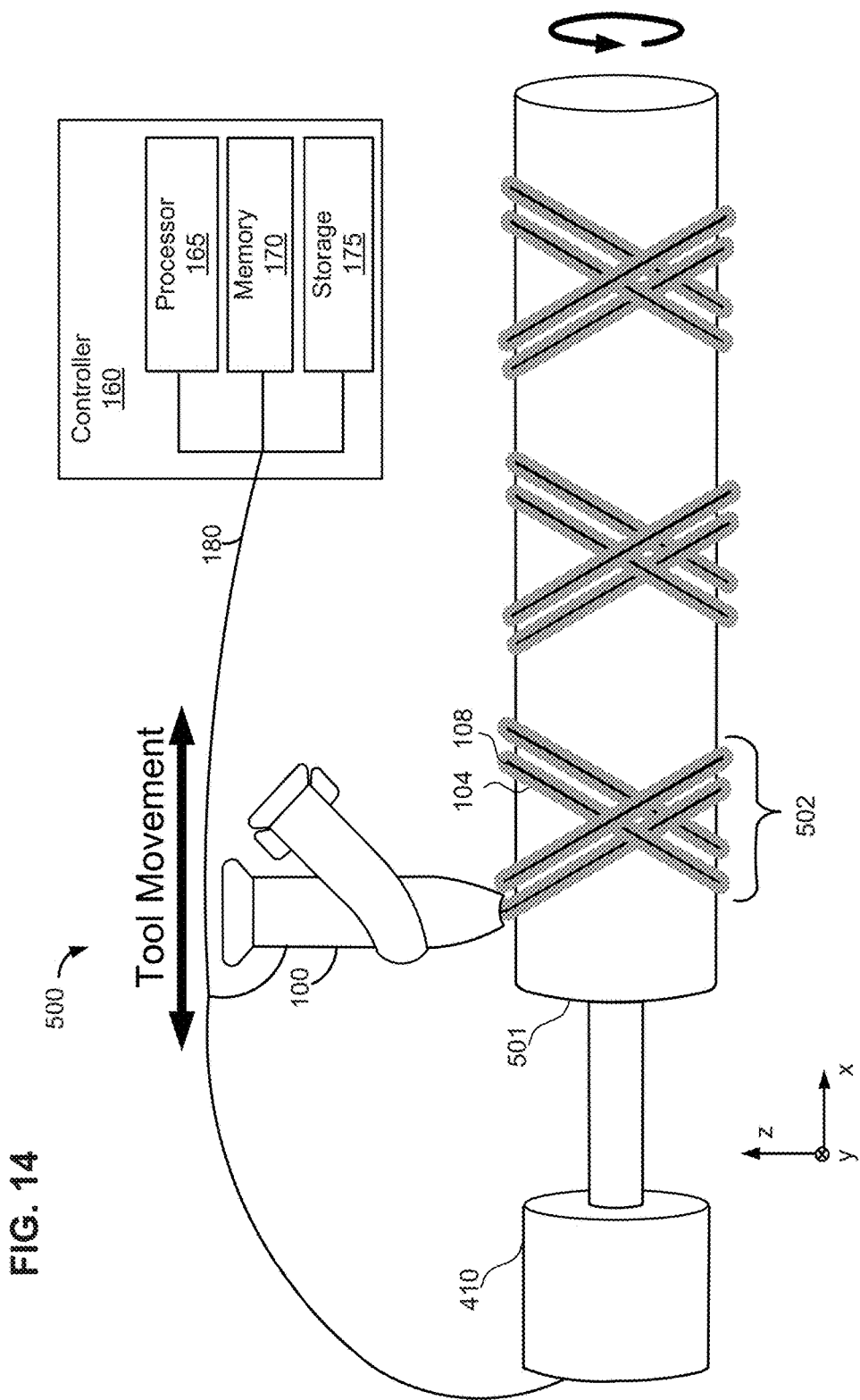
FIG. 14 illustrates a molding technique in accordance with some embodiments of the present disclosure.

With reference to FIG. 14, coaxial extruder 100 may be used to wind a filament (e.g., core 108 and bulk 104) to form a composite material layered about a 3D structure. As depicted, a printer system including an extruder (e.g. coaxial extruder 100, FIG. 1A-1C) may rotate mandrel 501 about an ordinate axis. In some embodiments, mandrel 501 forms a 3D structure. A printer system including an extruder (e.g. coaxial extruder 100, FIG. 1A-1C) may move a filament winding head in a direction parallel to the ordinate axis. In some embodiments, the filament winding head includes coaxial extruder head 100. Further, a printer system including an extruder (e.g. coaxial extruder 100, FIG. 1A-1C) may wind a filament core 108 and a bulk 104 (e.g., viscous liquid) around the mandrel to form the composite material.

In some embodiments, coaxial extruder 100 depicted in FIGS. 1A-1C may be used to filament wind. For example, coaxial extruder 100 depicted in FIG. 1A may be used with a thermoplastic cladding (e.g., bulk 104) and carbon-fiber core (e.g., core 108). Likewise, the coaxial extruder depicted in FIGS. 1A-1C may use an epoxy cladding (e.g., bulk 104) and a Kevlar fiber core (e.g., core 108). In some embodiments, a tensioner may be used to maintain a tensional force to the extruded composite material.

With reference to FIGS. 15A-15D, an additive manufacturing system is illustrated in accordance with some embodiments of the present disclosure. A printer system including an extruder (e.g. coaxial extruder 100, FIG. 1A-1C) may form a filament winding layered structure 502 on mandrel 501 may combine 3D printing on mandrel 501 to custom the 3D structure. As depicted, the process first involves, forming a 3D-print structure 526 on a surface 510 of a cylinder using a highly soluble material 605 to form mandrel 501. The printer system including an extruder (e.g. coaxial extruder 100, FIG. 1A-1C) may rotate mandrel 501 about an ordinate axis. Further, the printer system including an extruder (e.g. coaxial extruder 100, FIG. 1A-1C) may move filament winding head in a direction parallel to the axis. In addition, the printer system including an extruder (e.g. coaxial extruder 100, FIG. 1A-1C) may wind a filament (e.g., core 108 and bulk 104) around the elastic bladder mandrel to form layered composite structure 502.

To release layered structure 502 from mandrel 501, the printer system including an extruder (e.g. coaxial extruder 100, FIG. 1A-1C) may place a first endcap 525 over a first end of layered composite structure 502 and place a second endcap 522 over a second end of layered composite structure. In some embodiments, second endcap 522 may include inlet hole 523 between an outside surface of second endcap 522 and a region inside layered composite structure 502, and an outlet hole 524 between an outside surface of second endcap 522 and a region inside layered composite structure 502. Further, the printer system including an extruder (e.g. coaxial extruder 100, FIG. 1A-1C) may inject liquid solution 310 (e.g., solvent) into inlet hole 523 of second endcap 522, wherein liquid solution 310 (e.g., solvent) dissolves highly soluble material 605 and exits outlet 524 of second endcap 522.

Because the material custom printed on cylinder (e.g. mandrel 501) of the material is highly soluble (e.g., highly soluble material 605), this technique beneficially provides fast separation and removal of mandrel 501 without damaging the formed layered structure 502. In some embodiments an elastic bladder may be placed over mandrel 501 prior to winding. This facilitates a hermetical seal between first endcap 525 to the elastic bladder and second endcap 522 to the elastic bladder. Further, this beneficially encloses liquid solution 310 (e.g., solvent) that is injected through inlet hole 523 and through outlet hole 524 of second endcap 522.

With reference to FIG. 16A-16D, the extruder head includes a first extruder configured to deposit insoluble material, e.g. thermoplastics, and a second extruder configured to deposit a highly soluble material. This extruder facilitates the technique of using highly soluble material to bridge regions devoid of structure in the final object.

Referring to FIGS. 16A-16D, a side view cross-section of bulk bead layers is illustrated in accordance with some embodiments of the present disclosure. A printer system including a coaxial extruder (e.g., coaxial extruder 100, FIGS. 1A-1C) may form first support structure 130A made of a first material (e.g., bulk 104A) and a second support structure 130B made of a second material (e.g., bulk 104B). In some embodiments, a region between the first and second support structures is devoid of material (e.g., void region 215) and the bulk material is insoluble. The printer system including a coaxial extruder (e.g., coaxial extruder 100, FIGS. 1A-1C) may dispose highly soluble material 605 in the region between first and second support structures 130A, 130B. Further, the printer system including a coaxial extruder (e.g., coaxial extruder 100, FIGS. 1A-1C) may extrude an insoluble material over the highly soluble material 605; and dissolving the highly soluble material.

In some embodiments, first and second support structures 130A, 130B span multiple layers. Prior to disposing highly soluble material 605 in void region 215 between first and second support structures 130A, 130B, first and second support structures 130A, 130B provide support to deposit bridge 606 layer that is disposed over both bulk 104 and highly soluble material 605 as a 'bridge.' As depicted in FIG. 16A-16D the six layers that make up first and second support structures 130A, 130B are disposed prior to disposing highly soluble material 605.

Figure 16A:
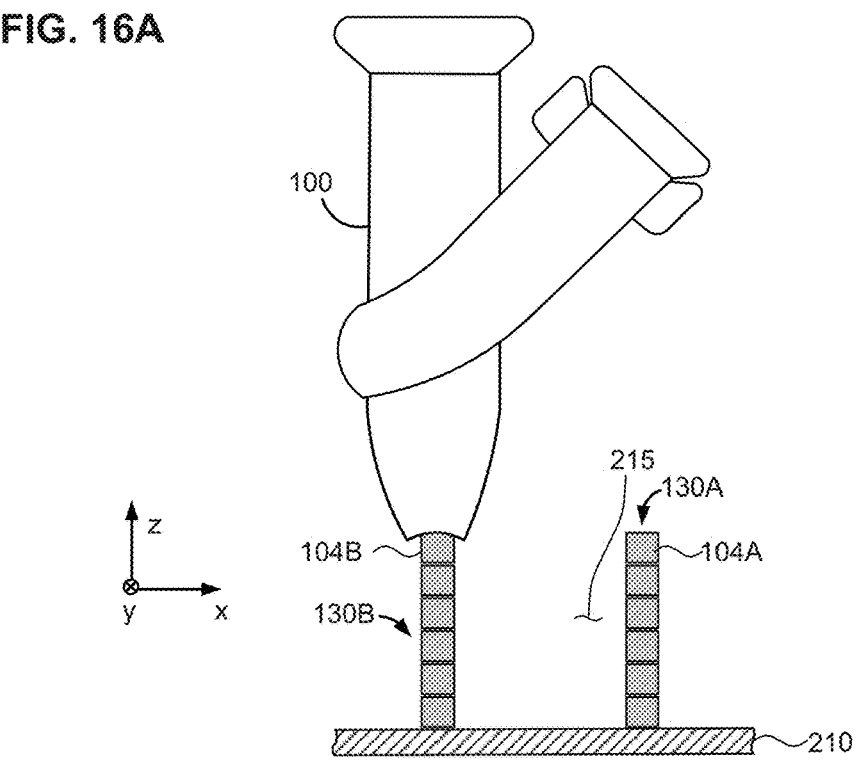
FIGS. 16A-16D illustrates a side view cross-section of bulk bead layers in accordance with some embodiments of the present disclosure.
Figure 16B:
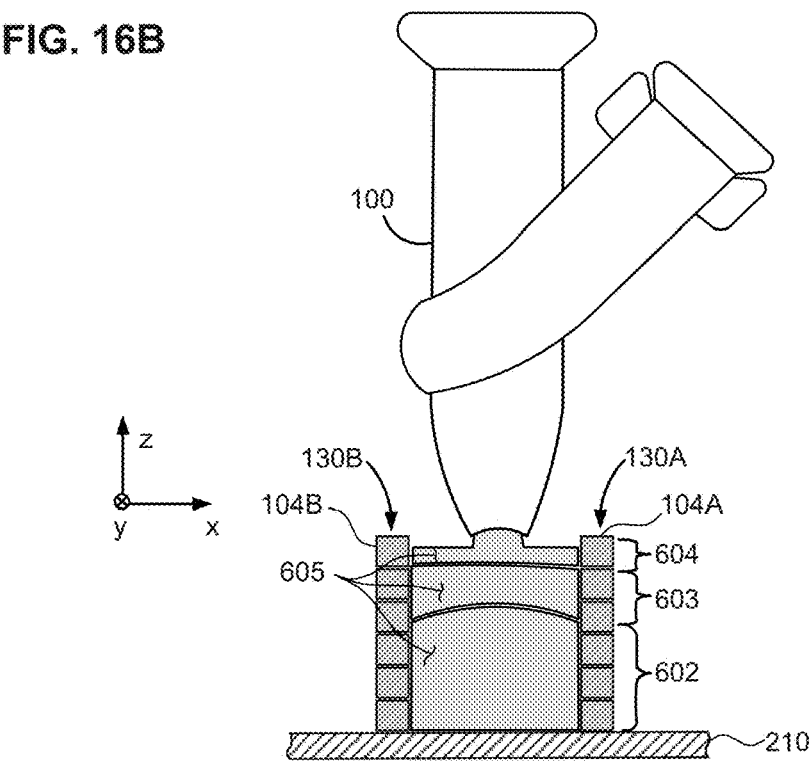

In some embodiments, highly soluble material 605 may be dispensed at a defined rate. As depicted in FIG. 16B, some or the majority of highly soluble material 605 fills void region 215 at high rate 602. Subsequently, coaxial extruder slows to modest rate 603 to fill void region 215 moderately but, for the most part, with more precision than highest rate 602. Coaxial extruder further slows to low rate 604 to ensure a smooth uniform surface for the top of the highly soluble material 605 layer. The uniformity of the top of the highly soluble material 605 layer correlates to a smooth uniform bottom surface 607 (FIG. 16D) to bridge 606.

Figure 16C:
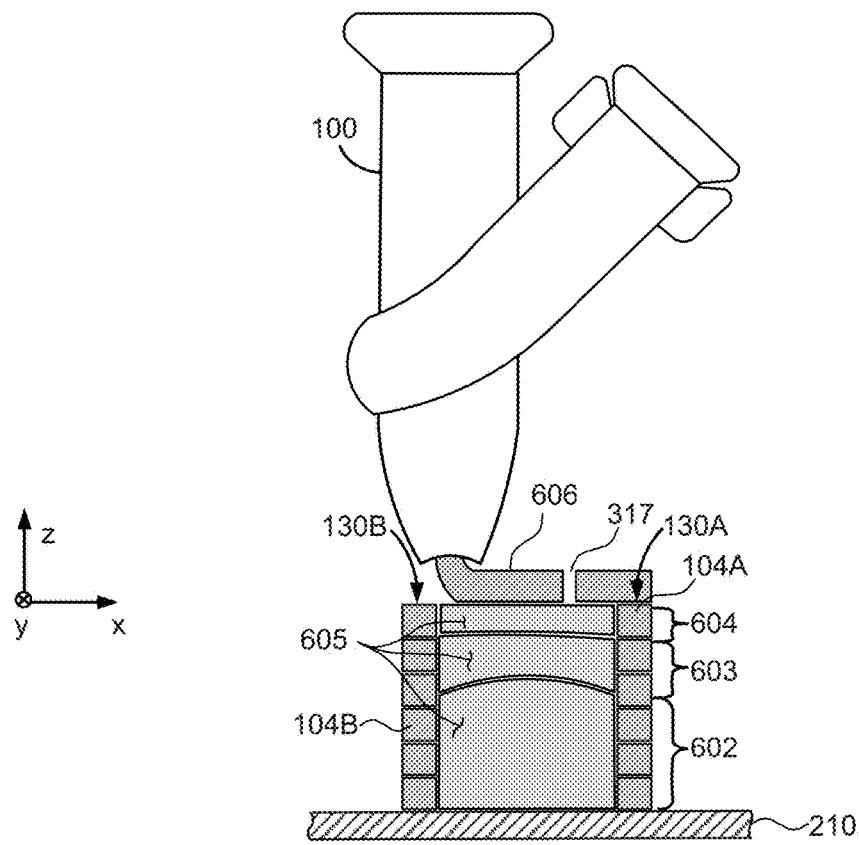

As depicted in FIG. 16C, coaxial extruder 100 deposits bridge 606 over first support structures 130A, highly soluble material 605, and second support structures 130B. As depicted, outlets 317 are included in bridge 606 to facilitate access of liquid solution 310 (e.g., solvent) between the outer surface of bridge 606 and highly soluble material 605. It should be appreciated that bridge 606 projects along the x-y plane and includes multiple adjacent layers and some bridge 606 layers may not include outlets 317.

Figure 16D:
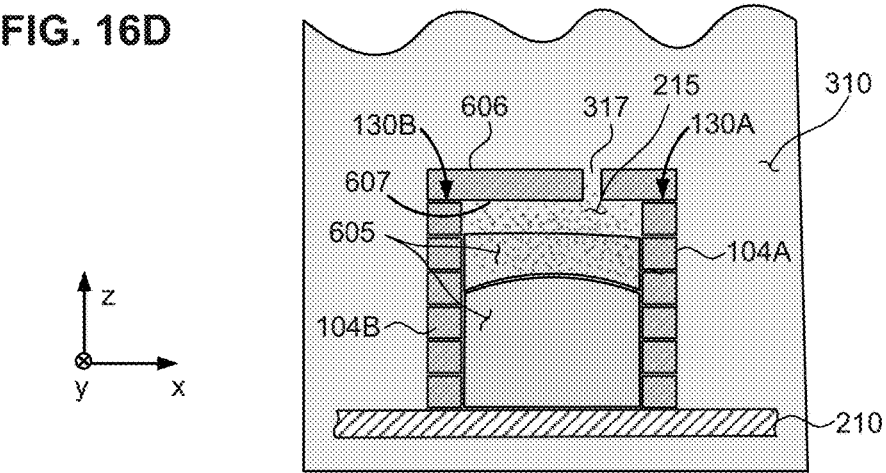

As depicted in FIG. 16D, the formed object is submerged in liquid solution 310 (e.g., solvent) to dissolve highly soluble material 605. Some embodiments may include injection mechanism 304 with inlet 314 and outlet 317 to facilitate the dissolution of highly soluble material 605.

In some embodiments, coaxial extruder head 100 may dispose highly soluble material 605 in void region 215 between first and second support structures 130A, 130B successively. This beneficially provides a sublayer without voids.

In some embodiments, highly soluble material 605 is a sucrose based "frosting" that quickly dissolves in water. In some embodiments, bulk 104 is a thermoplastic.

Figure 17A:
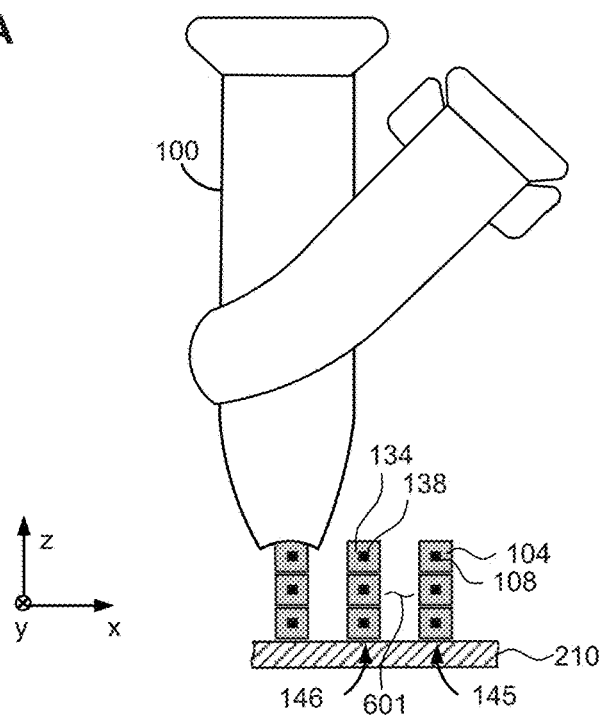
FIGS. 17A and 17B illustrates a side view cross-section of composite bead layers in accordance with some embodiments of the present disclosure.
Figure 17B:
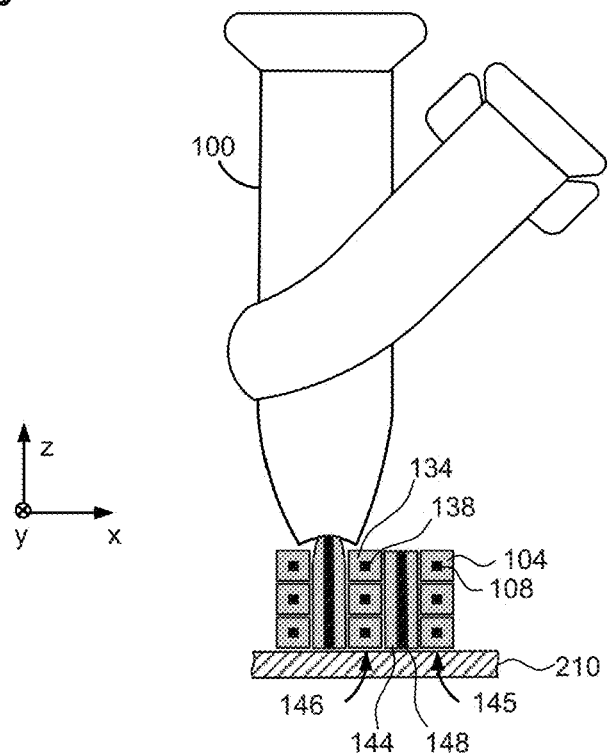

With reference to FIGS. 17A and 17B, a side view cross-section of a composite bead layer deposition process is illustrated. For example, a composite bead layer may include core 108 and bulk 104 cladding to form three-dimensional printed layup with voided regions 215. Coaxial extruder 100 subsequently fills voided region 215 with an extruded composite bead 113C with core 108 and bulk 104 cladding.

In some embodiments, the bead layer deposition process may be performed at or by a printer system including extruder head (e.g., extruder head 100, FIGS. 1A-1C). Specifically, for example, printer system including extruder head (e.g., extruder head 100, FIGS. 1A-1C) may initially deposit first material (e.g., bulk 104 and core 108) at first location 145 on the surface in a first direction (e.g., z-direction).

Printer system including extruder head (e.g., extruder head 100, FIGS. 1A-1C) may deposit a second material (e.g., bulk 134 and core 138) at second location 146 different from first location 145 on the surface in the first direction (e.g., z-direction). In some embodiments, depositing second material (e.g., bulk 134 and core 138) at second location 146 forms cavity region 601 between first material (e.g., bulk 104 and core 108) deposited in first location 145 and second material (e.g., bulk 134 and core 138). Further, printer system including extruder head (e.g., extruder head 100, FIGS. 1A-1C) may deposit a third material (e.g., bulk 144 and core 148) within cavity region 601 in a second direction different from the first direction (e.g., z-direction) to form the material structure on the surface of the object.

In some embodiments, printer system including extruder head (e.g., extruder head 100, FIGS. 1A-1C) may repeat the depositing of the first material (e.g., bulk 104 and core 108) at first location 145 and second material (e.g., bulk 134 and core 138) at second location 146 until a threshold material limit is met. In some instances, the threshold material limit may be a height of one or both of first material (e.g., bulk 104 and core 108) at the first location 145 or the second material (e.g., bulk 134 and core 138) at the second location 146.

In some embodiments, the first direction is parallel to the surface of the object and the second direction is perpendicular to the surface of the object. In some embodiments, the first direction is perpendicular to the surface of the object and the second direction is parallel to the surface of the object. In some embodiments, depositing the first material, the second material and the third material includes depositing using an extruder head (e.g., extruder head 100, FIGS. 1A-1C). In some embodiments, the first material (e.g., bulk 104 and core 108) and the second material (e.g., bulk 134 and core 138) are different materials. In some embodiments, the first material and the second material are similar materials.

In some embodiments, printer system including extruder head (e.g., extruder head 100, FIGS. 1A-1C) may fill cavity region 601 with third material (e.g., bulk 144 and core 148). For example, cavity region 601 may accommodate a volume larger than bead width of third material (e.g., bulk 144 and core 148) from extruder head (e.g., extruder head 100, FIGS. 1A-1C). In these instances, extruder head (e.g., extruder head 100, FIGS. 1A-1C) may fill cavity region 601 in a manner that overlaps of tangles core 148 within cavity region 601.

FIG. 18A illustrates an insertion actuator assembly for a printer in accordance with some embodiments of the present disclosure. For example, insertion actuator assembly 700 includes insertion actuator driver/gear 701 (e.g., filament drive gear) with four low-friction idler bearings positioned to contour bulk 104 filament or core 108 filament around insertion actuator gear 701 (e.g., filament drive gear).

Although shown using four low-friction idler bearings, it should be understood that insertion actuator assembly may include two or more idler bearings configured to apply a load to a portion of a filament positioned between a surface of the driver and a surface of the two or more idler bearings. In some embodiments, idler bearings may include first idler bearing 722 and second idler bearing 724. For instance, insertion actuator driver/gear 701 may direct the portion of the filament against a surface of first idler bearing 722 at a first tangential angle and a surface of second idler bearing 724 at a second tangential angle different from the first tangential angle. Further, the surface of the two or more idler bearings 722 and 724 may include contours to the filament and/or ridges.

Insertion actuator assembly 700 may also include motor 707 to drive or actuate insertion actuator driver/gear 701, which in turn, directs the filament in a direction corresponding to a rotation of actuator driver/gear 701. As such, insertion actuator driver/gear 701 may be connected to the motor 707. Further, insertion actuator assembly 700 may include load distribution assembly 720, which may be configured to adjust and maintain a load or force to the filament. Load distribution assembly 720 may include member 703 configured to connect to the first idler bearing 722 and the second idler bearing 724. In some embodiments, the member 703 may be configured to distribute a load between the first idler bearing 722 and the second idler bearing 724.

Further, load distribution assembly 720 may include at least one spring 709 coupled to first adjustment member 706 (e.g., knob).

Figure 19:
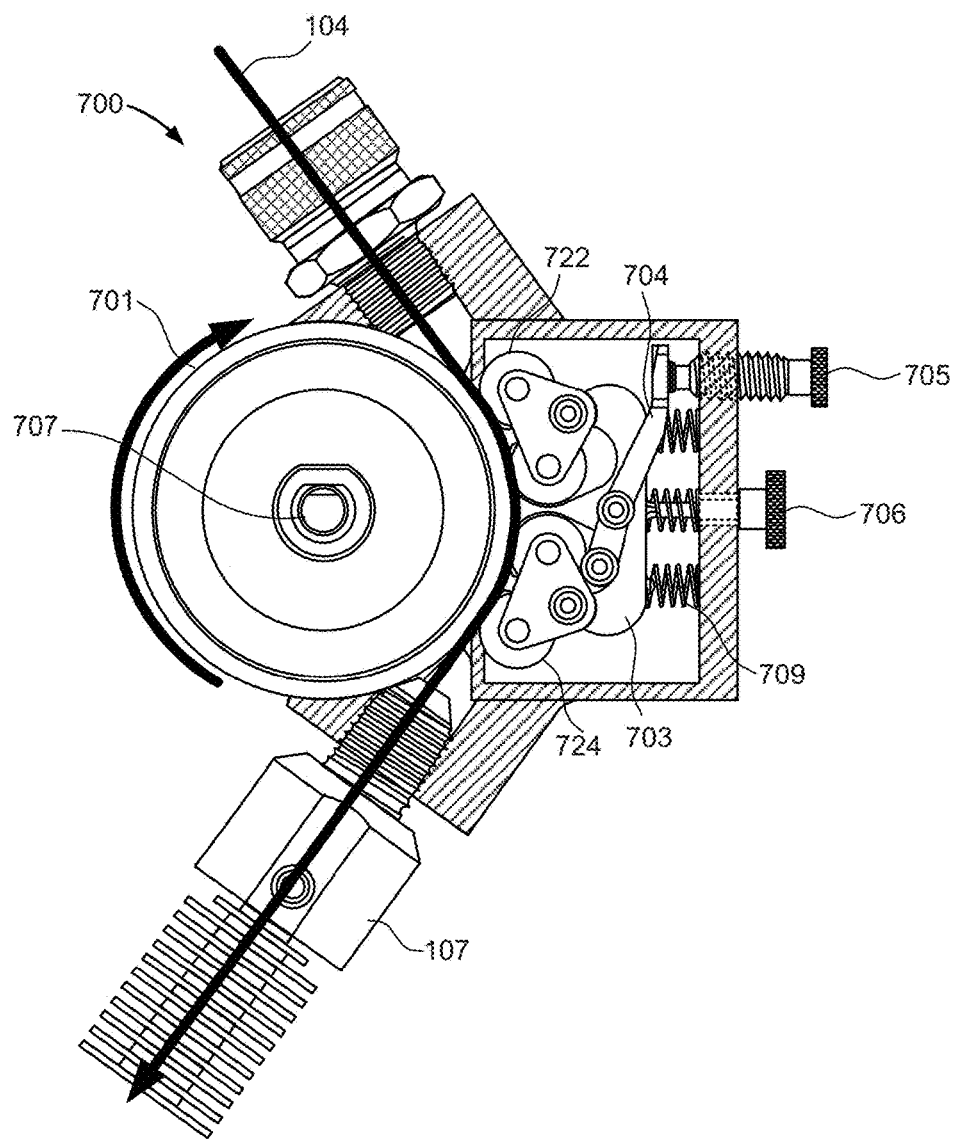
FIG. 19 illustrates a side view of bulk filament threaded through an insertion actuator assembly in accordance with some embodiments of the present disclosure.

In addition, load distribution assembly 720 may include lever 704 connected to the member 703, and which may be configured to redistribute the load between the first idler bearing 722 and the second idler bearing 724. In some embodiments, load distribution assembly 720 may include second adjustment member 705 (e.g., knob) coupled to the lever 704. For example, load distribution assembly 720 may be configured to adjust a distribution of the load or force (e.g., $F_1$, $F_2$, $F_3$, and/or $F_4$) via lever 704 based on adjusting second adjustment member 705 (e.g., rotating the knob in a clockwise or counterclockwise direction). Accordingly, one or more of the load or force applied by first idler bearing 722 ($F_1$, $F_2$) and/or the load or force applied by second idler bearing 724 ($F_3$, $F_4$) may be adjusted using lever 704. As such, a contour, size, shape, and/or thickness of a filament may be correspondingly adjusted as it enters and travels between insertion actuator driver/gear 701 and idler bearings 722 and 724, as shown in FIG. 19.

FIG. 18B illustrates a side view of insertion actuator driver/gear 701 in accordance with some embodiments of the present disclosure. For example, insertion actuator driver/gear 701 (e.g., filament drive gear) may include one or more ridges or contours 708 disposed around groove circumference 711. In some embodiments, the surface of insertion actuator driver/gear 701 may include one or more concave ridges, one or more angled ridges, and/or one or more convex ridges.

Figure 20:
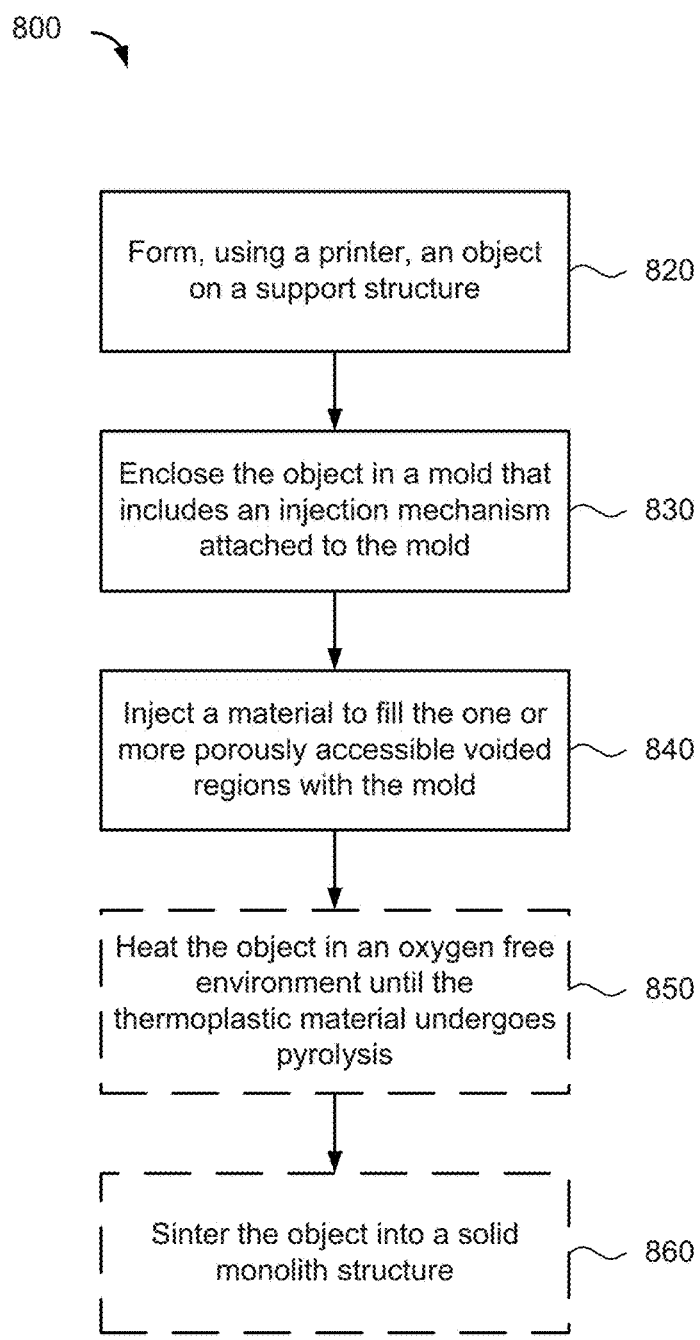
FIG. 20 is a flow diagram illustrating an active molding process in accordance with some embodiments of the present disclosure (e.g., according to FIGS. 10 and 11).

FIG. 20 is a flow diagram illustrating active molding method 800 in accordance with some embodiments of the present disclosure. Specifically, method 800 provides for forming complex composite structures in accordance with some embodiments. In some embodiments, method 800 may be performed at or by printer 150 including coaxial extruder 100 (FIGS. 1D and 6-9). Some blocks and/or operations in method 800 may be combined, the order of some blocks and/or operations may be changed, and some blocks and/or operations may be omitted.

At block 820, method 800 may form, using a printer, an object on a support structure. For example, as described herein, printer 150 (FIG. 1D) may drive the coaxial extruder 100 (FIGS. 1A-1C) to form composite structure 211 (FIG. 9) on support structure 210 (FIG. 9). In some embodiments, the object includes one or more porously accessible voided regions.

At block 830, method 800 may enclose the object in a mold that includes an injection mechanism attached to the mold. For instance, as described herein, mold cavity 313 (FIG. 10) may enclose (e.g., partially or completely) composite structure 211 (FIGS. 9-10) in a mold 300 (FIGS. 10-11) that includes injection mechanism 304 attached to the mold.

At block 840, method 800 may inject a material to fill the one or more porously accessible voided regions with the mold. For example, as described herein, infusion device 301 (e.g., syringe) (FIG. 11) may inject bulk fluid 302 (FIG. 11) to fill the one or more porously accessible voided regions 215 with the mold 300 (FIGS. 10-11).

At block 850, method 800 may optionally heat the object in an oxygen free environment until the thermoplastic material undergoes pyrolysis. For instance, as described herein, an oven may heat composite structure 211 (FIGS. 9-10) in an oxygen free environment until the thermoplastic material (e.g., bulk 104) undergoes pyrolysis.

At block 860, method 800 may optionally sinter the object into a solid monolith structure. For example, as described herein, a high temperature oven may sinter composite structure 211 (FIGS. 9-10) into a solid monolith structure.

Figure 21:
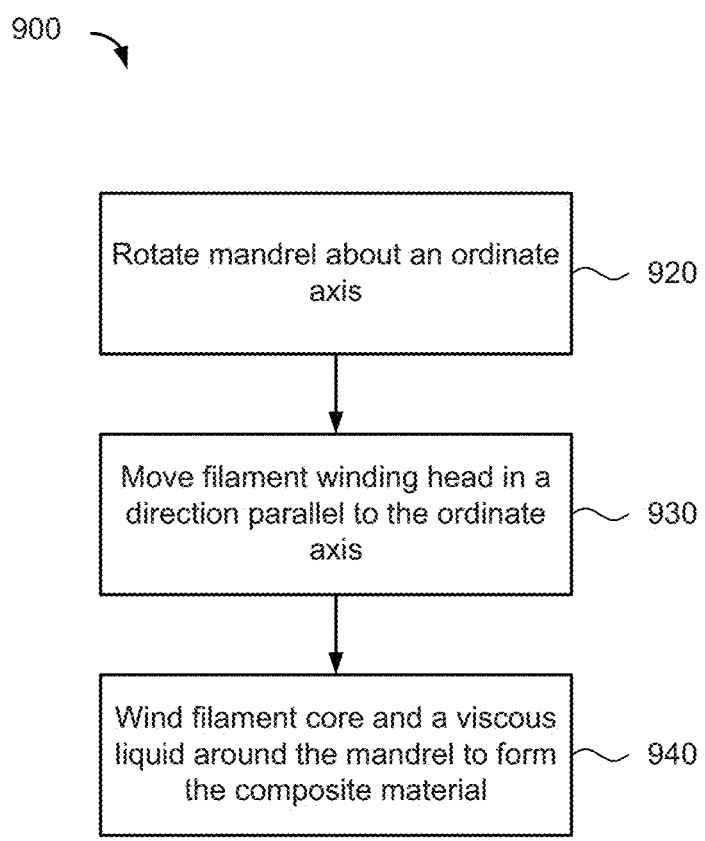
FIG. 21 is a flow diagram illustrating a material injection process in accordance with some embodiments of the present disclosure (e.g., according to FIG. 14).

FIG. 21 is a flow diagram illustrating a material injection method in accordance with some embodiments of the present disclosure. Specifically, method 900 provides for providing a composite structure on a mandrel in accordance with some embodiments. In some embodiments, method 900 may be performed at or by printer 500 (FIGS. 14-15). Some blocks and/or operations in method 900 may be combined, the order of some blocks and/or operations may be changed, and some blocks and/or operations may be omitted.

At block 920, method 900 may rotate a mandrel about an ordinate axis. For example, as described herein, motor 410 (FIG. 14) may rotate a mandrel 501 (FIG. 14) about an ordinate axis. In some embodiments, the mandrel forms a 3D structure.

At block 930, method 900 may move a filament winding head in a direction parallel to the ordinate axis. For instance, as described herein, motor actuators controlled via controller 160 (FIG. 14) may move a filament winding head (FIG. 14) in a direction parallel to the ordinate axis. In some embodiments, the filament winding head includes a coaxial extruder head.

At block 940, method 900 may wind a filament core and a viscous liquid around the mandrel to form the composite material. For example, as described herein, mandrel printer 500 (FIG. 14) may wind a filament core 108 (FIG. 14) and a viscous liquid 104 (FIG. 14) around the mandrel 501 (FIG. 14) to form the composite material 502 (FIG. 14).

Figure 22:
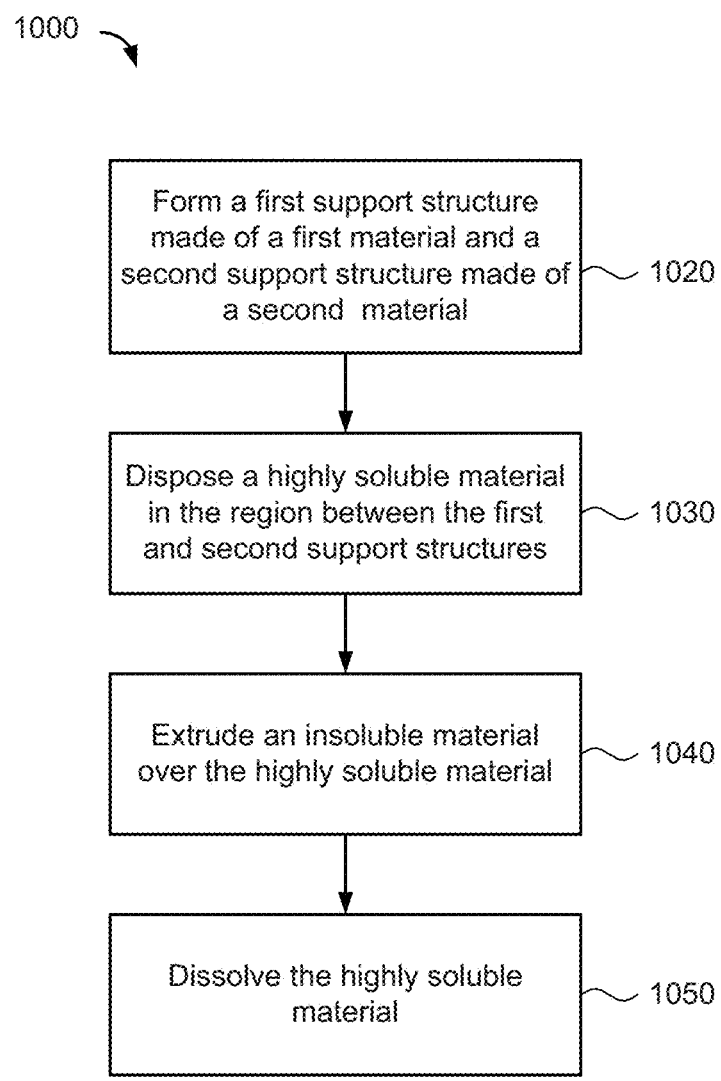
FIG. 22 is a flow diagram illustrating an additive manufacturing process in accordance with some embodiments of the present disclosure (e.g., according to FIGS. 14 and 15).

FIG. 22 is a flow diagram illustrating an additive manufacturing process in accordance with some embodiments of the present disclosure. Specifically, method 1000 provides for forming a bulk bead 113A over voided region 215 in accordance with some embodiments. In some embodiments, method 1000 may be performed at or by coaxial extruder 100 and a container of liquid solution 310 (FIGS. 16A-16D). Some blocks and/or operations in method 1000 may be combined, the order of some blocks and/or operations may be changed, and some blocks and/or operations may be omitted.

At block 1020, method 1000 may form a first support structure made of a first material and a second support structure made of a second material. For example, as described herein, coaxial extruder 100 (FIG. 16A) may form a first support structure 130A (FIGS. 16A-16D) made of a first material 104A (FIGS. 16A-16D) and a second support structure 130B (FIGS. 16A-16D) made of a second material 104B (FIGS. 16A-16D). In some embodiments, a region between the first and second support structures may be devoid of material and the bulk material is insoluble.

At block 1030, method 1000 may dispose a highly soluble material in the region between the first and second support structures. For instance, as described herein, coaxial extruder 100 (FIG. 16B) may dispose a highly soluble material 605 (FIG. 16B) in the region between the first 130A and second support structures 130B (FIG. 16A).

At block 1040, method 1000 may extrude an insoluble material over the highly soluble material. For example, as described herein, coaxial extruder 100 (FIG. 16C) may extrude an insoluble material (e.g. bulk 104A) (FIG. 16C) over the highly soluble material 605 (FIG. 16C).

At block 1050, method 1000 may dissolve the highly soluble material. For instance, as described herein, liquid solution 310 may dissolve the highly soluble material 605 (FIG. 16D).

Figure 15A:
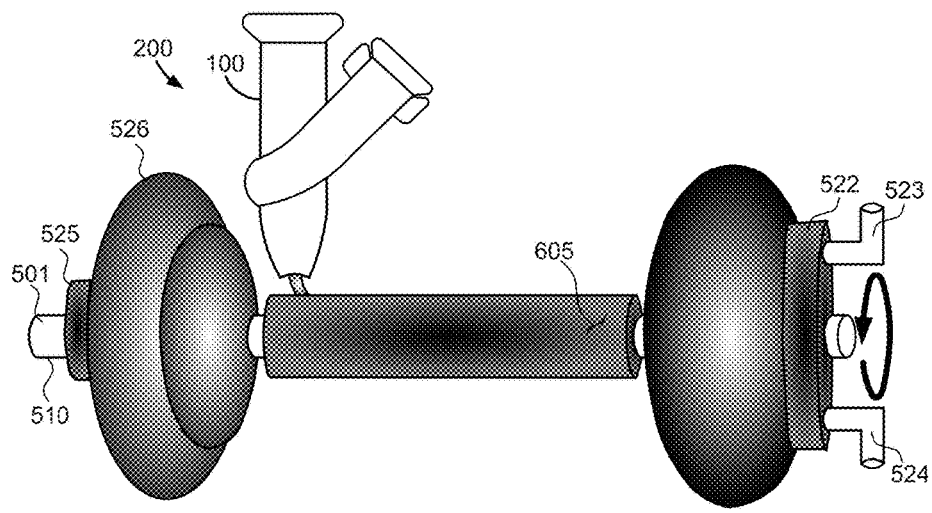
FIGS. 15A-15D illustrates an additive manufacturing system in accordance with some embodiments of the present disclosure.
Figure 23:
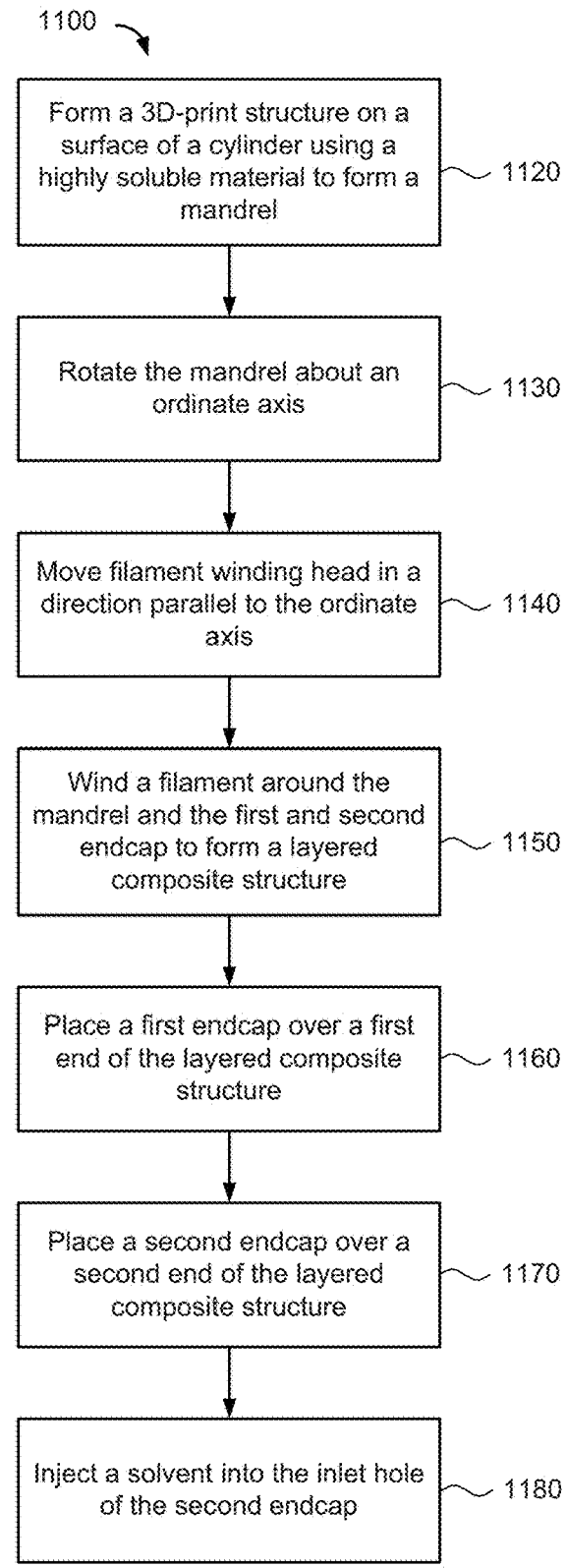
FIG. 23 is a flow diagram illustrating a technique of adding layers over void regions accordance with some embodiments of the present disclosure (e.g., according to FIG. 16).

FIG. 23 is a flow diagram illustrating a technique of adding layers over void regions accordance with some embodiments of the present disclosure. Specifically, method 1100 provides for removing mandrel 501 after forming structures on mandrel 501 in accordance with some embodiments. In some embodiments, method 1100 may be performed at or by coaxial extruder 100, first endcap 525 and second endcap 522, and liquid solution injected via inlet hole 523 and outflow 524 (FIG. 15A). Some blocks and/or operations in method 1100 may be combined, the order of some blocks and/or operations may be changed, and some blocks and/or operations may be omitted.

At block 1120, method 1100 may form a 3D-print structure on a surface of a cylinder using a highly soluble material to form a mandrel. For instance, as described herein, coaxial extruder 100 (FIG. 15A) may form a 3D-print structure 526 (FIG. 15A) on a surface 510 (FIG. 15A) of a cylinder (FIG. 15A) using a highly soluble material 605 (FIG. 15B) to form a mandrel 501 (FIG. 15A).

At block 1130, method 1100 may rotate the mandrel about an ordinate axis. For example, as described herein, motor 401 (FIG. 14) may rotate the mandrel 501 (FIGS. 14 and 15A-15B) about an ordinate axis.

At block 1140, method 1100 may move filament winding head in a direction parallel to the ordinate axis. For instance, as described herein, controller 160 (FIG. 14) may move filament winding head (e.g., coaxial extruder 100) (FIGS. 14 and 15B) in a direction parallel to the ordinate axis.

Figure 15B:
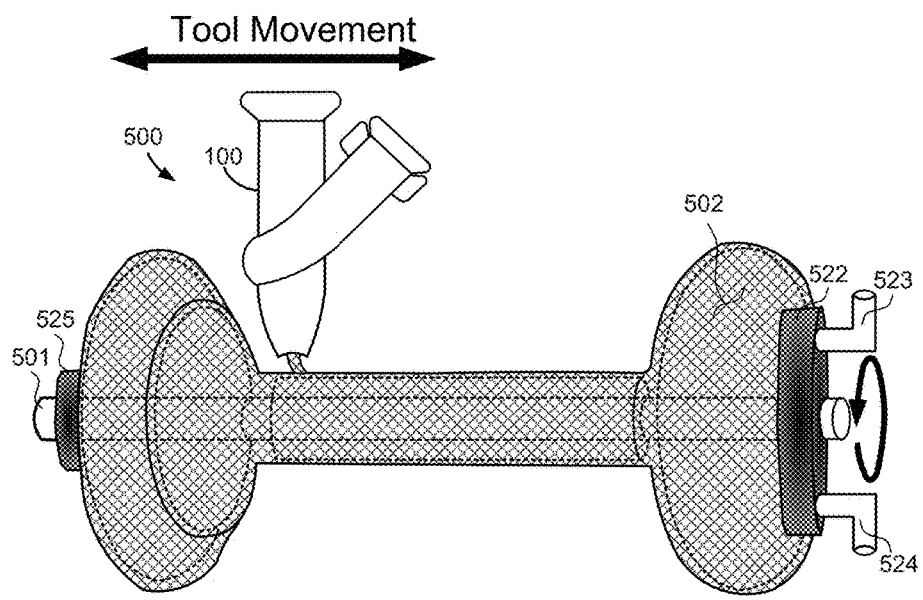
Figure 15C:
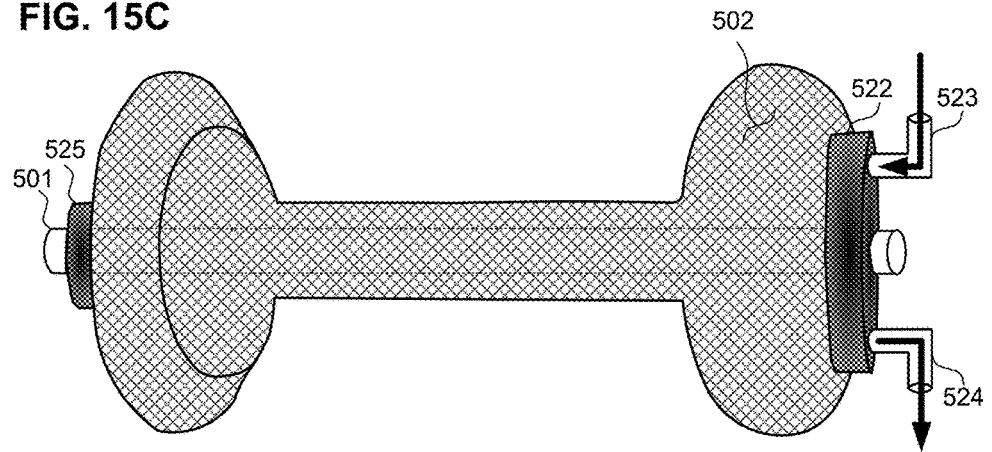
Figure 15D:
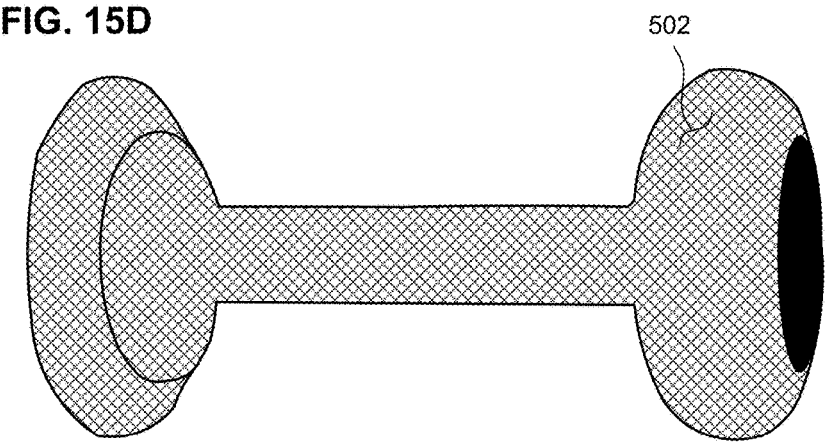

At block 1150, method 1100 may wind a filament around the mandrel and the first and second endcap to form a layered composite structure. For example, as described herein, controller 160 (FIG. 14) may wind a filament (e.g., core 108 and bulk 104) (FIG.14) around the mandrel 501 (FIGS. 14 and 15B) and the first endcap 525 (FIG. 15A-15C) and second endcap 522 (FIG. 15A-15C) to form a layered composite structure 502 (FIG. 15B-15D).

At block 1160, method 1100 may place a first endcap over a first end of the layered composite structure. For example, as described herein, a first endcap 525 (FIG. 15B-15C) may be placed over a first end of the layered composite structure 502 (FIG. 15B-15D).

At block 1170, method 1100 may place a second endcap over a second end of the layered composite structure. For instance, as described herein, a second endcap 522 (FIG. 15B-15C) may be placed over a second end of the layered composite structure 502 (FIG. 15B-15D). In some embodiments, the second endcap includes an inlet hole between an outside surface of the second endcap and a region inside the layered composite structure, and an outlet hole between an outside surface of the second endcap and a region inside the layered composite structure.

At block 1180, method 1100 may inject a solvent into the inlet hole of the second endcap. For instance, as described herein, liquid solution pump (FIG. 15C) may inject a solvent (e.g., liquid solution 310) (FIG. 16D) into the inlet hole 523 (FIG. 15C) of the second endcap 522 (FIG. 15C). In some embodiments, the solvent dissolves highly soluble material and exits the outlet of the second endcap.

Figure 24:
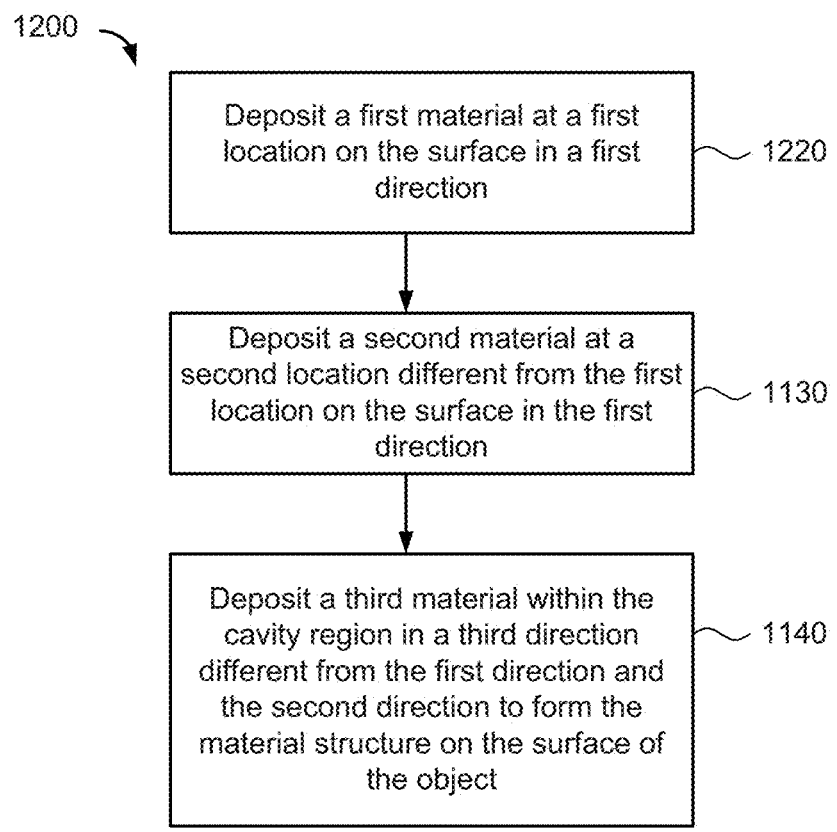
FIG. 24 is a flow diagram illustrating of multiple layers with some embodiments of the present disclosure (e.g., according to FIG. 17).

FIG. 24 is a flow diagram illustrating of multiple layers with some embodiments of the present disclosure. Specifically, method 1200 provides for forming a material structure on a surface of an object with improved material properties (e.g., isometric stiffness and strength) in accordance with some embodiments. In some embodiments, method 1200 may be performed at or by controller 160 and coaxial extruder 100 (FIGS. 17A-17B). Some blocks and/or operations in method 1200 may be combined, the order of some blocks and/or operations may be changed, and some blocks and/or operations may be omitted.

At block 1220, method 1200 may deposit a first material at a first location on the surface in a first direction. For example, as described herein, coaxial extruder 100 (FIG. 17A) may deposit a first material (e.g., bulk 104 and core 108) (FIG. 17A) at a first location 145 (FIG. 17A) on the surface (e.g., support structure 210) (FIGS. 17A-17B) in a first direction (e.g., z-direction) (FIG. 17A).

At block 1220, method 1200 may deposit a second material at a second location different from the first location on the surface in the first direction. For instance, as described herein, coaxial extruder 100 (FIG. 17A) may deposit a second material (e.g., bulk 134 and core 138) (FIG. 17A) at a second location 146 (FIG. 17A) different from the first location 145 (FIG. 17A) on the surface (e.g., support structure 210) (FIGS. 17A-17B) in the first direction. In some embodiments, depositing the second material at the second location forms a cavity region between the first material deposited in the first location and the second material.

At block 1220, method 1200 may deposit a third material within the cavity region in a second direction different from the first direction to form the material structure on the surface of the object. For example, as described herein, coaxial extruder 100 (FIG. 17A) may deposit a third material (e.g., bulk 144 and core 148) (FIG. 17B) within the cavity region 601 (FIG.17A) in a third direction different from the first direction and the second direction to form the material structure on the surface of the object.

Although the techniques have been described in conjunction with particular embodiments, it should be appreciated that various modifications and alterations may be made by those skilled in the art without departing from the spirit and scope of the invention. Embodiments may be combined and embodiments described in connection with an embodiment may stand alone.

What is claimed is:

1. An insertion actuator for a 3D printer head comprising:
   a motor;
   a driver connected to the motor, wherein the motor is configured to actuate the driver;
   a load distribution assembly including:
      a first set of idler bearings;
      a second set of idler bearings;
      a load distribution member operatively coupled to the first set of idler bearings and the second set of idler bearings, wherein the load distribution member is configured to apply a load to a filament positioned between a first surface of the driver and the first set of idler bearings at a first tangential angle along the first surface of the driver and between a second surface of the driver and the second sets of idler bearings at a second tangential angle along the second surface of the driver different from the first tangential angle; and
      a load adjustment lever pivoted about a center of the load distribution member; and
   one or more filament guiding members connected to the load distribution assembly, wherein the one or more filament guiding members are configured to align the filament approximately at the first tangential angle and approximately at the second tangential angle.

2. The insertion actuator of claim 1, wherein the load distribution assembly further includes a first load adjustment member connected to the center of the load distribution member.

3. The insertion actuator of claim 1, wherein the load distribution assembly further includes a second load adjustment member coupled to the load adjustment lever.

4. The insertion actuator of claim 1, wherein one or both of the first surface of the driver and the second surface of the driver includes any one of: one or more concave ridges, one and more convex ridges, and one or more angled ridges.

5. The insertion actuator of claim 1, wherein a surface of any one of the first set of idler bearings and the second set of idler bearings includes ridges or contours.

6. The insertion actuator of claim 2, wherein the first load adjustment member is configured to adjust the load equally between the first set of idler bearings and the second set of idler bearings.

7. The insertion actuator of claim 2, wherein the first load adjustment member is configured to be displaced along a rotational axis of the first load adjustment member.

8. The insertion actuator of claim 1, wherein the load adjustment lever is configured to redistribute the load between the first set of idler bearings and the second set of idler bearings.

9. The insertion actuator of claim 3, wherein the second load adjustment member is configured to be displaced along a rotational axis of the second load adjustment member.

10. The insertion actuator of claim 1, wherein the load distribution assembly further includes a first member connecting the load distribution member to the first set of idler bearings.

11. The insertion actuator of claim 10, wherein the load distribution assembly further includes a second member connecting the load distribution member to the second set of idler bearings.

12. The insertion actuator of claim 1, wherein the driver is concentrically connected to the motor.

13. The insertion actuator of claim 1, wherein the load is proportional to a diameter of the driver.

14. The insertion actuator of claim 1, further comprising: one or more springs connected to the load distribution member, the one or more springs are configured to apply the load to the filament.

15. The insertion actuator of claim 1, wherein the driver has a diameter greater than one or more idler bearings of the first set of idler bearings.

16. An insertion actuator for a 3D printer head comprising:
   a motor;
   a filament driver connected to the motor, wherein the motor is configured to actuate the filament driver; and
   a load distribution assembly including:
      a first load distribution member with a set of idler bearings connected at opposite ends of the first load distribution member, wherein the first load distribution member is configured to apply a first load to a filament positioned between a first surface of the filament driver and the set of idler bearings at a first tangential angle along the first surface of the filament driver;
      a second load distribution member with at least one idler bearing operatively coupled to an end of the first load distribution member, wherein an opposing end of the second load distribution member is connected to the first load distribution member between the opposite ends of the first load distribution member, and wherein the second load distribution member is configured to apply a second load to the filament positioned between a second surface of the filament driver and the at least one idler bearing at a second tangential angle along the second surface of the filament driver different from the first tangential angle; and a load adjustment lever pivoted about a center of the second load distribution member; and one or more filament guiding members connected to the load distribution assembly, wherein the one or more filament guiding members are configured to align the filament approximately at the first tangential angle and approximately at the second tangential angle.

17. The insertion actuator of claim 16, wherein the load distribution assembly further includes a first load adjustment member connected to the center of the second load distribution member.

18. The insertion actuator of claim 16, wherein the load distribution assembly further includes a second load adjustment member coupled to the load adjustment lever.

19. The insertion actuator of claim 16, wherein one or both of the first surface of the filament driver and the second surface of the filament driver includes any one of: one or more concave ridges, one or more convex ridges, and one or more angled ridges.

20. The insertion actuator of claim 16, wherein a surface of any one of the set of idler bearings and the at least one idler bearing includes ridges or contours.

21. The insertion actuator of claim 17, wherein the first load adjustment member is configured to adjust the first load and the second load equally between the set of idler bearings and the at least one idler bearing.

22. The insertion actuator of claim 17, wherein the first load adjustment member is configured to be displaced along a rotational axis of the first load adjustment member.

23. The insertion actuator of claim 16, wherein the load adjustment lever is configured to redistribute the first load and the second load between the set of idler bearings and the at least one idler bearing.

24. The insertion actuator of claim 18, wherein the second load adjustment member is configured to be displaced along a rotational axis of the second load adjustment member.

25. The insertion actuator of claim 16, wherein the filament driver is concentrically connected to the motor.

26. The insertion actuator of claim 16, wherein one or both of the first load and the second load is proportional to a diameter of the filament driver.

27. The insertion actuator of claim 16, further comprising: one or more springs connected to the second load distribution member, the one or more springs are configured to apply one or both of the first load and the second load to the filament.

28. The insertion actuator of claim 16, wherein the filament driver has a diameter greater than one or more idler bearings of the set of idler bearings and the at least one idler bearing.

29. An insertion actuator for a 3D printer head comprising:

a motor;

a driver connected to the motor, wherein the motor is configured to actuate the driver;

a load distribution assembly including:
a first set of idler bearings;
a second set of idler bearings;
a load distribution member operatively coupled to the first set of idler bearings and the second set of idler bearings, wherein the load distribution member is configured to apply a load to a filament positioned between a first surface of the driver and the first set of idler bearings at a first tangential angle along the first surface of the driver and between a second surface of the driver and the second sets of idler bearings at a second tangential angle along the second surface of the driver different from the first tangential angle; and a load adjustment member pivoted about a center of the load distribution member, wherein the load adjustment member is configured to adjust the load equally between the first set of idler bearings and the second set of idler bearings; and one or more filament guiding members connected to the load distribution assembly, wherein the one or more filament guiding members are configured to align the filament approximately at the first tangential angle and approximately at the second tangential angle.

30. The insertion actuator of claim 29, wherein one or both of the first surface and the second surface of the driver includes one any of: one or more concave ridges, one or more convex ridges, and one or more angled ridges.

31. The insertion actuator of claim 29, wherein a surface of any one of the first set of idler bearings and the second set of idler bearings includes ridges or contours.

32. The insertion actuator of claim 29, wherein the first load adjustment member is configured to be displaced along a rotational axis of the load adjustment member.

33. The insertion actuator of claim 29, wherein the load distribution assembly further includes a first member connecting the load distribution member to the first set of idler bearings.

34. The insertion actuator of claim 33, wherein the load distribution assembly further includes a second member connecting the load distribution member to the second set of idler bearings.

35. The insertion actuator of claim 29, wherein the driver is concentrically connected to the motor.

36. The insertion actuator of claim 29, wherein the load is proportional to a diameter of the driver.

37. The insertion actuator of claim 29, further comprising: one or more springs connected to the load distribution member, the one or more springs are configured to apply the load to the filament.

38. The insertion actuator of claim 29, wherein the driver has a diameter greater than one or more idler bearings of the first set of idler bearings.

39. An insertion actuator for a 3D printer head comprising:

a motor;

a filament driver connected to the motor, wherein the motor is configured to actuate the filament driver; and a load distribution assembly including:
a first load distribution member with a set of idler bearings connected at opposite ends of the first load distribution member, wherein the first load distribution member is configured to apply a first load to a filament positioned between a first surface of the filament driver and the set of idler bearings at a first tangential angle along the first surface of the filament driver;

a second load distribution member with at least one idler bearing operatively coupled to an end of the first load distribution member, wherein an opposing end of the second load distribution member is connected to the first load distribution member between the opposite ends of the first load distribution member, and wherein the second load distribution member is configured to apply a second load to the filament positioned between a second surface of the filament driver and the at least one idler bearing at a second tangential angle along the second surface of the filament driver different from the first tangential angle; and a load adjustment member pivoted about a center of the second load distribution member, wherein the load adjustment member is configured to adjust the first load and the second load equally between the set of idler bearings and the at least one idler bearing; and one or more filament guiding members connected to the load distribution assembly, wherein the one or more filament guiding members are configured to align the filament approximately at the first tangential angle and approximately at the second tangential angle.

40. The insertion actuator of claim 39, wherein the first surface of the filament driver and the second surface of the filament driver includes any one of: one or more concave ridges, one or more convex ridges, and one or more angled ridges.

41. The insertion actuator of claim 39, wherein a surface of any one of the set of idler bearings and the at least one idler bearing includes ridges or contours.

42. The insertion actuator of claim 39, wherein the first load adjustment member is configured to displace along a rotational axis of the first load adjustment member.

43. The insertion actuator of claim 39, wherein the filament driver is concentrically connected to the motor.

44. The insertion actuator of claim 39, wherein one or both of the first load and the second load is proportional to a diameter of the filament driver.

45. The insertion actuator of claim 37, further comprising: one or more springs connect to the second load distribution member, wherein the one or more springs are configured to apply one or both of the first load and the second load to the filament.

46. The insertion actuator of claim 37, wherein the filament driver has a diameter greater than one or more idler bearings of the set of idler bearings and the at least one idler bearing.

* * * * *